United States Patent
Gillespie et al.

(10) Patent No.: US 6,215,816 B1
(45) Date of Patent: Apr. 10, 2001

(54) PHYSICAL LAYER INTERFACE DEVICE

(75) Inventors: Alan Gillespie, Edinburgh; Michael Harwood, Northampton, both of (GB)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/034,251

(22) Filed: Mar. 4, 1998

Related U.S. Application Data

(60) Provisional application No. 60/038,577, filed on Mar. 4, 1997.

(51) Int. Cl.[7] .................................................. H04B 1/38
(52) U.S. Cl. .......................... 375/219; 375/220; 375/257; 375/258; 375/316; 370/402
(58) Field of Search ..................................... 375/257, 258, 375/259, 219, 220, 316; 370/465, 468, 401, 402, 445, 425

(56) References Cited

U.S. PATENT DOCUMENTS

| | | | |
|---|---|---|---|
| 5,577,069 | * 11/1996 | Lau et al. | 375/242 |
| 5,598,406 | * 1/1997 | Albrecht et al. | 370/296 |
| 5,610,903 | * 3/1997 | Crayford | 370/213 |
| 5,717,720 | * 2/1998 | Jackson et al. | 375/316 |
| 5,771,237 | * 6/1998 | Kao | 370/463 |
| 5,818,269 | * 10/1998 | Brown et al. | 327/108 |
| 5,896,417 | * 4/1999 | Lau | 375/258 |
| 5,991,303 | * 11/1999 | Mills | 370/402 |
| 6,067,585 | * 6/1998 | Hoang | 710/11 |

* cited by examiner

*Primary Examiner*—Stephen Chin
*Assistant Examiner*—Dac V. Ha
(74) *Attorney, Agent, or Firm*—J. Dennis Moore; Wade James Brady, III; Frederick J. Telecky, Jr.

(57) ABSTRACT

A single chip dual function 10 Base-T/100 Base-X physical layer interface device (PHY) compatible with existing 5 V parts is provided. The PHY includes a media-independent interface (MII) and connects to an unshielded twisted pair cable via an isolation transformer and a single RJ45 connector. The PHY includes built-in auto-negotiation circuitry that allows for automatic selection of half/full duplex 10 Base-T and 100 Base-TX, while auto-polarity correction circuitry ensures immunity to receive pair reversal in the 10 Base-T mode of operation. The PHY includes internal PLL circuitry that uses a single 20 MHz clock or crystal, but that is suitable for either speed mode. The PHY includes low-power and power down modes. The 10 Base-T portions of the PHY include smart squelch for improved receive noise immunity. The PHY includes high jitter tolerance clock recovery circuitry and transmit jabber detection circuitry. The 10 Base-T portions of the PHY include on board transmit waveshaping. The 100 Base-X portions of the PHY include synthesized rise time control for reduced electromagnetic interference (EMI). The PHY includes a programmable transmit voltage amplitude for 100 Base-X MLT-3 waveform generation and integrated adaptive equalization circuitry and baseline wander correction (DC restoration) circuitry for the 100 Base-X receiver.

30 Claims, 15 Drawing Sheets

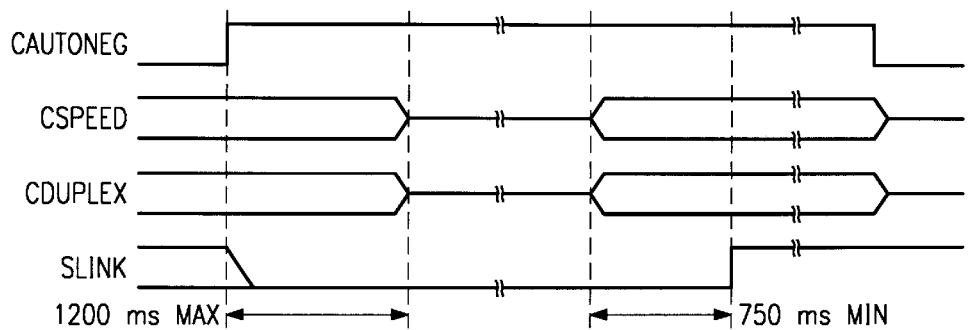

FIG. 3

| GEN_ctl | GENERIC CONTROL REGISTER |
| GEN_sts | GENERIC STATUS REGISTER |
| GEN_id_hi | GENERIC IDENTIFIER (HIGH) |
| GEN_id_lo | GENERIC IDENTIFIER (LOW) |
| AN_adv | AUTO-NEGOTIATION ADVERTISEMENT |
| AN_lpa | AUTO-NEGOTIATION LINK-PARTNER ABILITY |
| AN_exp | AUTO-NEGOTIATION EXPANSION |
| AN_np | AUTO-NEGOTIATION NEXT-PAGE TRANSMIT |
| RESERVED | |
| RESERVED | RESERVED BY IEEE 802.3 |
| RESERVED | |
| TXPHY_id | PHY IDENTIFIER |
| TXPHY_ctl | PHY CONTROL REGISTER |
| TXPHY_sts | PHY STATUS REGISTER |

FIG. 4

| START DELIMITER | OPERATION CODE | PHY ADDRESS | REG ADDRESS | TURN-AROUND | DATA |
|---|---|---|---|---|---|
| 01 | 10 | AAAAA | RRRRR | Z0 | DDDD.DDDD.DDDD.DDDD |

FIG. 5A

| START DELIMITER | OPERATION CODE | PHY ADDRESS | REG ADDRESS | TURN-AROUND | DATA |
|---|---|---|---|---|---|
| 01 | 01 | AAAAA | RRRRR | 10 | DDDD.DDDD.DDDD.DDDD |

FIG. 5B

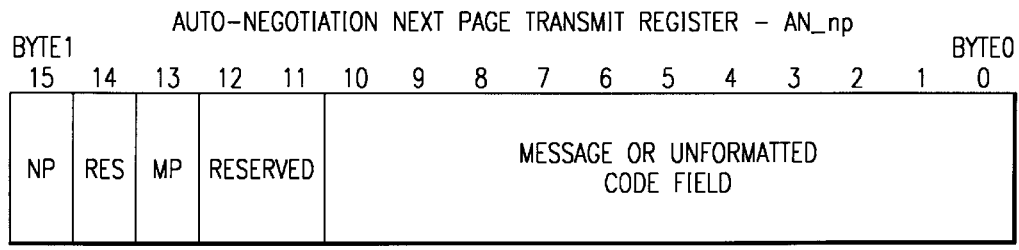
FIG. 12
TLAN PHY IDENTIFIER HIGH/LOW — TLPHY_id
0x0003
FIG. 13
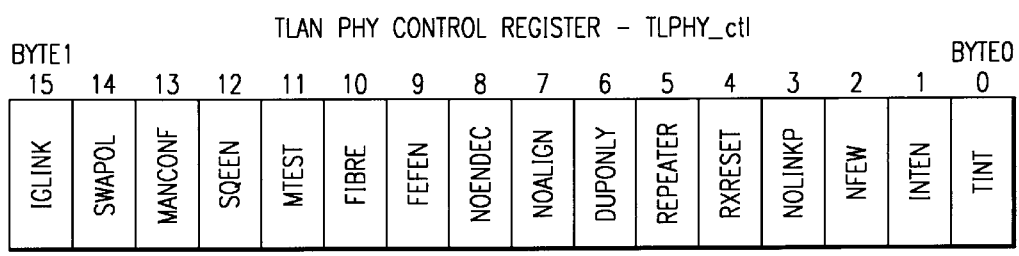
FIG. 14
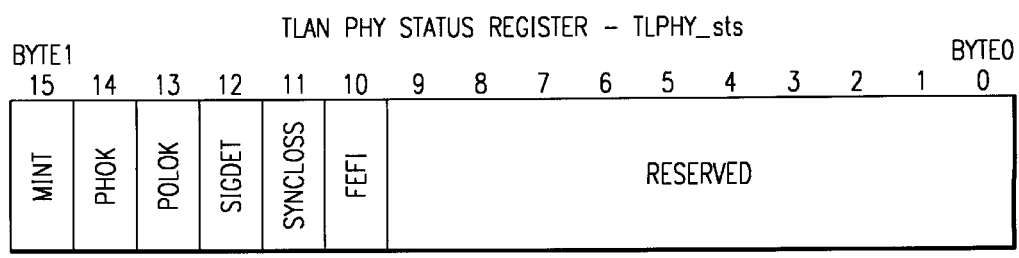
FIG. 15

KEY TO PIN NAME PREFIXES:
D  SUPPLY OR GROUND FOR DIGITAL LOGIC
A  SUPPLY OR GROUND FOR ANALOGUE CIRCUITRY
C  CONFIGURATION MODES
M  MEDIA INDEPENDENT INTERFACE CONNECTION
L  EXTERNAL LED'S
J  JTAG-TEST PORT
F  INTERFACE TO FIBRE TRANSCEIVER MODULE
S  INDICATING PHY STATUS
A  CONNECTIONS TO THE INTERNAL ANALOGUE CIRCUITRY

PHYSICAL LAYER INTERFACE DEVICE

This amendment claims priority under 35 U.S.C. § 119(e)(1) of provisional application number 60/038,577 filed Mar. 4, 1997.

FIELD OF THE INVENTION

This invention generally relates to digital communications, and more particularly to a physical layer interface device.

BACKGROUND OF THE INVENTION

Local area networks (LANs) have become widely accepted and used within many and various industries as a way to interconnect many work stations and/or personal computers (PCs) to allow them to share resources such as data and applications without the need for an expensive mainframe computer and its associated multiple attached terminals. One widely accepted LAN arrangement is an "Ethernet" LAN, which is defined in the IEEE 802.3 standard.

With the widespread acceptance of LANs and the continuing acceleration of technology, the demand for LAN arrangements with higher and higher transfer rates continues unabated. Two 100 Megabit per second (Mbps) LANs are extending the reach of the installed base of 10 Mbps Ethernet LANs. Although this increased transfer rate is desired, it often comes at the expense of replacing existing 10 Mbps equipment with new more expensive 100 Mbps equipment. However, some LANs may run with both types of equipment installed. It would be convenient to have a physical layer interface device that would operate at both transfer rates.

The present invention provides a LAN physical layer interface device that is capable of operating at both transfer rates in a cost effective and versatile manner.

SUMMARY OF THE INVENTION

A single chip dual function 10 Base-T/100 Base-X physical layer interface device (PHY) compatible with existing 5V parts is provided by the present invention. The PHY includes a media-independent interface (MII) and connects to an unshielded twisted pair cable via an isolation transformer and a single RJ45 connector. The PHY includes built-in auto-negotiation circuitry that allows for automatic selection of half/full duplex 10 Base-T and 100 Base-TX, while auto-polarity correction circuitry ensures immunity to receive pair reversal in the 10 Base-T mode of operation. The PHY includes internal PLL circuitry that uses a single 20 MHz clock or crystal, but that is suitable for either speed mode. The PHY includes low-power and power down modes. The 10 Base-T portions of the PHY include smart squelch for improved receive noise immunity. The PHY includes high jitter tolerance clock recovery circuitry and transmit jabber detection circuitry. The 10 Base-T portions of the PHY include on board transmit waveshaping. The 100 Base-X portions of the PHY include synthesized rise time control for reduced electromagnetic interference (EMI). The PHY includes a programmable transmit voltage amplitude for 100 Base-X MLT-3 waveform generation and integrated adaptive equalization circuitry and baseline wander correction (DC restoration) circuitry for the 100 Base-X receiver.

BRIEF DESCRIPTION OF THE DRAWINGS

The invention may be understood by reference to the detailed description which follows, read in conjunction with the accompanying drawings in which:

FIG. 3 depicts a simplified diagram of auto-negotiation configuration and status waveforms and timings for the physical layer interface device of FIG. 1.

FIG. 4 depicts a simplified block diagram of a basic set of registers employed in the physical layer interface device of FIG. 1.

FIGS. 5A and 5B depict a simplified diagram of the MII read and write frame formats, respectively.

FIG. 12 depicts a simplified diagram of the bit positions and signal names associated with each bit position for the auto-negotiation next page transmit register, AN_np.

FIG. 13 depicts a simplified diagram of the bit positions and signal names associated with each bit position for the TLAN PHY identifier high/low register, TLPHY_id.

FIG. 14 depicts a simplified diagram of the bit positions and signal names associated with each bit position for the TLAN PHY control register, TLPHY_ctl.

FIG. 15 depicts a simplified diagram of the bit positions and signal names associated with each bit position for the TLAN PHY status register, TLPHY_sts.

Corresponding numerals and symbols in the different Figures refer to corresponding parts unless otherwise indicated.

DETAILED DESCRIPTION

Figure 1:
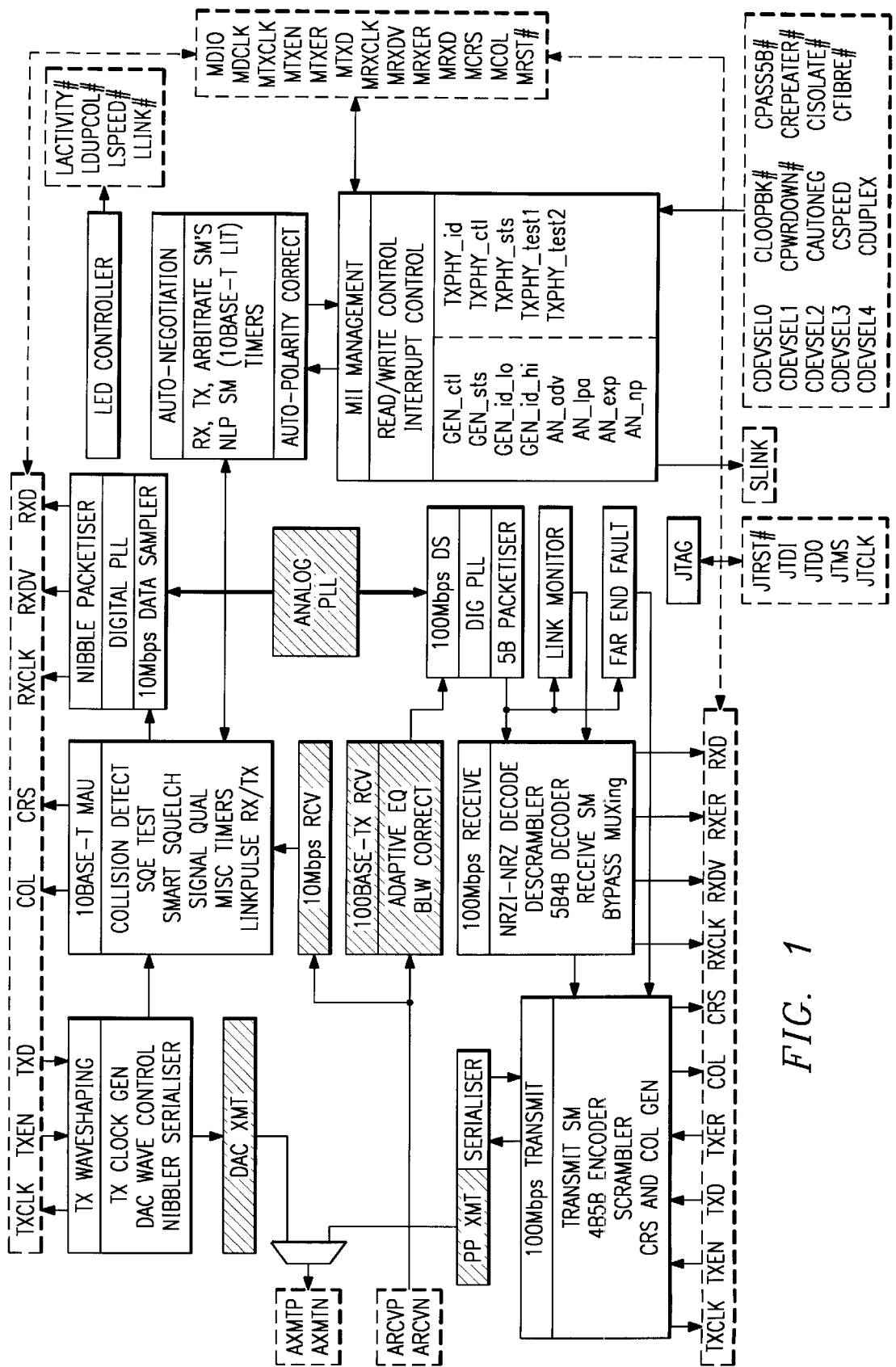
FIG. 1 depicts a simplified block diagram of the physical layer interface device of the present invention.

Referring now to FIG. 1, there may be seen a simplified block diagram of a physical layer interface device (PHY) of the present invention. As may be seen from FIG. 1, the present invention provides a single chip 10 Base-T/100 Base-X physical layer interface device (hereinafter 10/100 PHY or PHY). FIG. 1 also depicts the various signals provided to or supplied by the various blocks of the PHY of the present invention and their interconnections.

Figure 2:
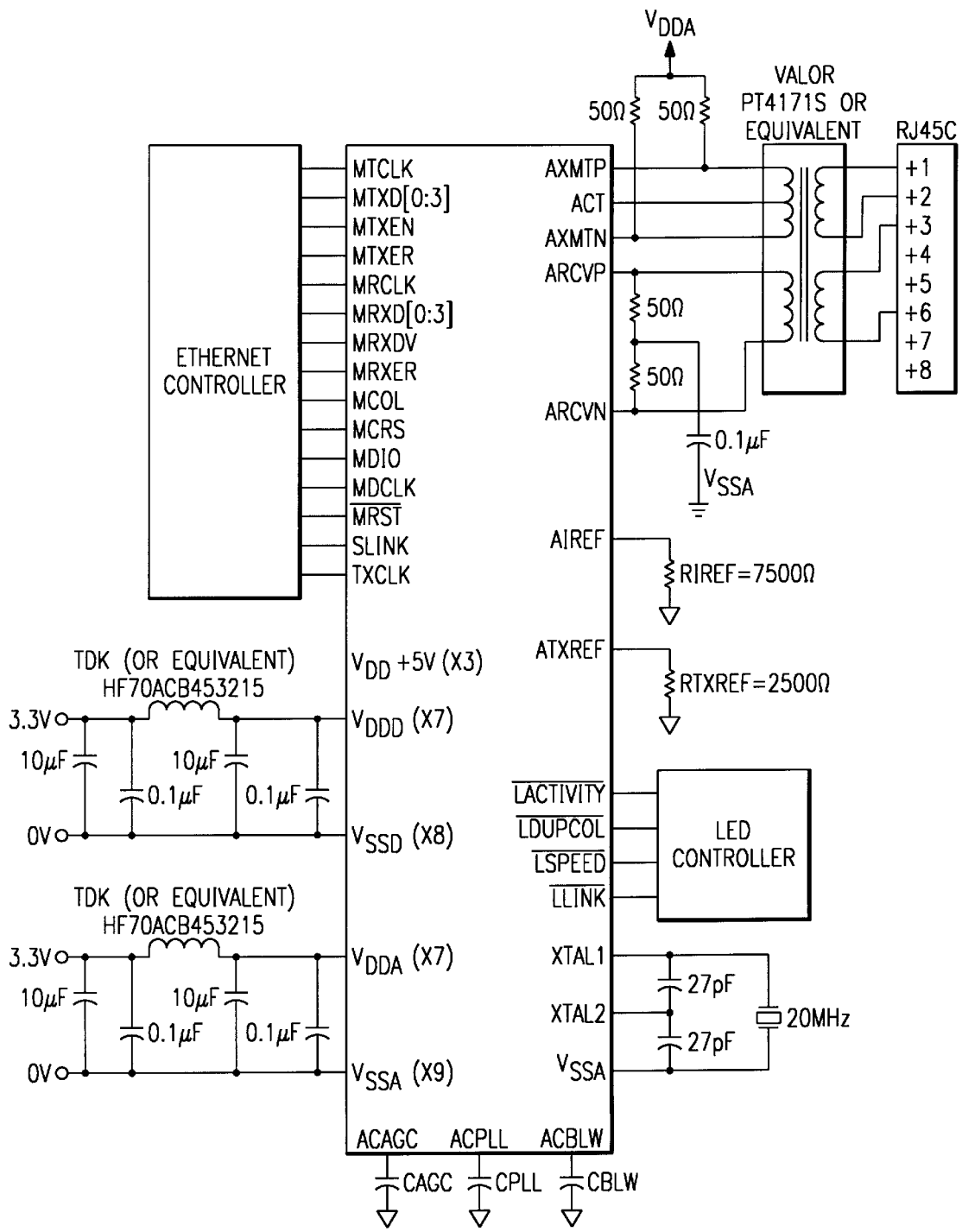
FIG. 2 depicts a simplified block diagram of the interconnection of the physical layer interface device of FIG. 1 with external components.

Briefly, the PHY of the present invention includes a media-independent interface (MII) to allow for easy connection to standard media access controller (MAC) devices, while connection to an unshielded twisted pair cable is via a simple isolation transformer and a single RJ45 connector (see FIG. 2). The PHY of the present invention does not require external components for filtering or rise-time control, and all equalization components are included on the chip. The operation of the device is controlled at either a pin level, via configuration pins, or using the management data interface and internal registers. The device includes built-in auto-negotiation circuitry that allows for automatic selection of half/full duplex 10 Base-T and 100 Base-TX, while auto-polarity correction circuitry ensures immunity to receive pair reversal in the 10 Base-T mode of operation.

The PHY of the present invention depicted in FIG. 1 provides a single package dual function 10 Base-T/100 Base-X physical layer interface device that preferably uses a CMOS design having a 3.3V supply, but that; is compatible with existing 5V parts, having a standard IEEE 802.3u media independent interface (MII) with 2-pin management interface. The PHY implements IEEE 802.3u auto-negotiation with next page support. The PHY supports a single transmit/receive transformer connected to a single RJ45 connector for both speeds of operation. The PHY requires a minimum external component count with all filtering and equalization components being integrated into the device. The PHY includes circuitry for internal loopback for system testing in both modes and includes an IEEE Standard 1149.1 test access port (JTAG). The PHY allows for connection to CAT3 cables (10 Base-T) or CAT5 cables (10 Base-T, 100 Base-TX) and uses isolated transmit/receive power supplies for minimum coupling therebetween. The PHY includes internal PLL circuitry that uses a single 20 MHz clock or crystal, but that is suitable for either speed mode. The PHY includes low-power and power down modes and includes full duplex support for both 10 Base-T and 100 Base-X.

The 10 Base-T portions of the PHY are fully IEEE 802.3 compliant and include smart squelch for improved receive noise immunity. The PHY includes a DSP-based digital phase-locked loop for high jitter tolerance clock recovery and transmit jabber detection circuitry. The 10 Base-T portions of the PHY include on board transmit waveshaping, with only external termination components being required, and auto-polarity (reverse polarity correction) circuitry.

The 100 Base-X portions of the PHY are fully compliant with ANSI twisted pair physical media dependent (TP-PMD) and IEEE 802.3u specifications and includes synthesized rise time control for reduced electromagnetic interference (EMI), so that no external capacitors are required for EMI control. The PHY includes a programmable transmit voltage amplitude for MLT-3 waveform generation and includes an integrated receiver and transmitter having integrated adaptive equalization circuitry and integrated baseline wander correction (DC restoration) circuitry. The PHY allows operation on twisted wire pair lengths ranging from 0 to 100 meters. The PHY allows for programmable or adaptive equalization control and includes a transmit off capability, for true quiet line state.

FIG. 2 depicts the interconnection of the PHY of the present invention with external components. The 10/100 PHY's differential line drivers are designed to drive at least 100 m of CAT5 cable in 100 Base-TX mode and in excess of 100 m CAT3 (or CAT5) cable in 10 Base-T mode. As depicted in FIG. 2, three transmit output pins (AXMTP, AXMTN, and a center tap connection ACT) interface to a single Valor PT4171S (or equivalent) transformer for both operating modes. This simplifies the external connection to a single RJ-45 socket which is connected directly to the transformer secondary winding.

The 10/100 PHY incorporates on-chip waveshaping for 10 Base-T transmission and rise-time control for 100 Base-TX transmission to enable the device to interface directly to the coupling transformer without the need for external components other than two termination resistors depicted in FIG. 2.

Referring now to FIG. 1, there may be seen a 10 Base-T transmitter section and a digital-to-analog (DAC) transmit (DAC XMT) section that converts the digital output of the transmitter block to an analog signal for transmission over an appropriate transmission medium, such as for example, but not limited to, a twisted pair. There may also be seen a 100 Mbps transmitter section that provides an output to a serializer block which is connected to a parallel transmit (PP XMT) section.

The 10 Mbps transmitter has a waveshaping portion that serves to take the data to be transmitted and in response to a transmit enable signal (TXEN) attempt to transmit a data stream (TXD) over the transmission medium. The 10 Mbps transmitter provides a DAC wave control signal and provides a nibbler serializer. This block of the transmitter provides a transmit clock signal (TXCLK) to the device supplying the data stream so that the device has the correct clock for the transmitter.

Similarly, the 100 Mbps transmitter has a transmit clock output signal (TXCLK), a collision output signal (COL) and carrier sense output signal (CRS) output to the device supplying the data stream. The 100 Mbps transmitter receives a data stream (TXD), a transmit enable signal (TXEN), and a transmit error signal (TXER) from the device supplying the data stream.

As depicted in FIG. 2, the two receiver input pins of the 10/100 PHY (ARCVP and ARCVN) must be connected to a properly terminated transmission line through an external isolation transformer, which is the same transformer employed for the transmit portions of the PHY. A single receiver input wire pair supports both speed modes, with all multiplexing functions performed internally to the device.

The receiver circuitry will establish its own common mode input bias voltage and no external resistor divider network is required. A simple external termination network consisting of two resistors and one capacitor, as depicted in FIG. 2, is presently preferred. Data received from the network is output on the MRXD nibble of the MII, synchronized to the rising edge of the corresponding MRCLK signal. The MRCLK frequency automatically adjusts between 2.5 MHZ in 1 Base-T mode and 25 MHz in 100 Base-X mode.

Referring now to FIG. 1, the 10 Base-T receiver incorporates a smart squelch function which only allows incoming data to pass if the input amplitude is greater than a minimum signal threshold and a specific pulse sequence is received. This protects against impulse line noise being mistaken for signal or link activity. The squelch circuits will quickly deactivate if pulses are received which are outside the specifications. Overly long pulses will not be mistaken as link pulses.

The 100 Base-TX receiver depicted in FIG. 1 contains the necessary circuitry to decode the MLT-3 waveform and provide a data nibble on the MRXD (0–3) pins. After the device receives a MLT-3 signal, the signal is immediately amplified and equalized. This allows reception over a minimum of 100 m of CAT5 cable. The MLT-3 signal has its low frequency component removed; this component may arise as a consequence of long delays without transitions in transformer coupled circuits and is often referred to as baseline wander. The ideal MLT-3 is then internally converted to NRZI, then re-synchronized to its own recovered clock using a digital phase-locked loop technique. The re-clocked data is then deserialized into 5-bit code groups, descrambled and 5B4B decoded. When a start of stream delimiter is detected in the 5B data stream the following frame is output on the MII.

As may also be seen from FIG. 1, both a 10 Mbps receiver (10 Mbps RCV) block and a 100 Mbps receiver (100 Base-TX RCV) block receive signals from the transmission medium. The signal from the 10 Mbps block is provided to a control block (10 BASE-T MAU) that serves to evaluate the received signal and perform selected functions, such as, for example, but not limited to, smart squelch, signal quality error (SQE) test, signal qualification and collision detection. This control block provides a collision detect (COL) and carrier sense signal (CRS) to any device receiving any data stream coming over the transmission medium. In addition, this block provides the received signals to another block that samples the data, synchronizes a PLL to the data clock, and nibble packetizes before supplying the data (RXD) and its clock signal (RXCLK) to the device; it also supplies the receive data valid (RXDV) signal to the device.

The 100 Mbps receiver (100 Base-TX RCV) block of FIG. 1 performs baseline wander correction and equalizes the received signals for the length of the transmission medium over which the signals have been transmitted. This receiver block provides the received data to a first control block that performs data sampling, 5B packetizing and synchronization with a digital PLL. The resulting signals are then provide to a second control block that includes a receive state machine and that performs NRZI-NRZ decoding, descrambling, 5B4B decoding, and bypass multiplexing.

Signals from the first control block are also provided to a link monitor and far end fault detector. The resulting received data from the second control block is provided to the device as receive data (RXD), along with the receive data clock (RXCLK), data receive data valid (RXDV) and receive error (RXER) signals.

In addition, there may be seen an auto-negotiation block, an analog PLL block and an LED controller block, an Mul management block, and a JTAG block in FIG. 1.

The LED controller block provides appropriate signals for LEDs that may be used to indicate the status of operation of the PHY. The 10/100 PHY has 4 pins which are designed to drive LEDs for ACTIVITY, DUPLEX/COLLISION, LINK and SPEED. The circuitry contains an open drain NMOS device for the LED driver and the LEDs should be connected to digital 3.3V through a current limiting resistor. The value of the resistor depends on the LED type.

The LINK LED will illuminate when the PHY has established a valid link in 10 Base-T mode. In 100 Base-TX mode it indicates that the descrambler has locked onto the data and that the 10/100 PHY is in a state where it can transmit and receive data. The LINK LED will flash during auto-negotiation in response to page reception. This provides an indication of link activity to the user as the auto-negotiation process may take several seconds to complete.

The ACTIVITY LED will illuminate when the PHY is transmitting or receiving data. This LED will illuminate for a minimum duration of 20 ms for each activity. Its operation is the same in both speed modes.

The DUPLEX/COLLISION LED will illuminate continuously when the PHY is in full duplex mode, and will illuminate for a minimum duration of 20 ms when collisions occur in half duplex mode. In the event of a continuous or frequent collisions this LED will flash at 10 Hz.

When in 10 Base-T mode and not in auto-negotiation mode (described below), the 10/100 PHY will send link pulses out on the data out (DO) circuit separated by an interval of 16 milliseconds (ms).

The receiver will look for valid link pulses on the input wire pair. If a link pulse is not received within a given time interval then the device will enter a link fail state. In this state link pulses will continue to be generated, and the receiver will constantly look for the link pulse pattern. The PHY preferably remains in this state until a valid receive packet or multiple legal link test pulses are received. Link pulses of the opposite polarity are also received and qualified in the same manner as normal link pulses. This is used to provide an indication that the receive pair connections are reversed and an automatic internal re-configuration occurs to correct this problem. Reverse polarity correction is not required in 100 Base-TX mode where the data is MLT-3 encoded.

The auto-negotiation block includes receive, transmit, and arbitration state machines for control of the transmit and receive blocks. This block also includes timers and an NLP state machine. Further, it is connected to the MII block and performs autopolarity correction.

The 10/100 PHY fully supports IEEE 802.3u auto-negotiation, including next page transfer. When enabled, this feature allows the 10/100 PHY to negotiate with any other auto-negotiation capable PHY on its link segment, to establish their highest common protocol. Until a PHY has completed its negotiation it will not assert LINK. More details of the link partner's abilities may be obtained by reading data in the 10/100 PHY registers.

For 10 Base-T mode, while in loop back mode all receive activity other than link test pulses, is ignored. However, squelch information is still processed, allowing the link status to be maintained under momentary loop back self test.

The PHY implements the full auto-negotiation standard, including next page capability. The three pins CAUTONEG, CSPEED and CDUPLEX are used to either directly configure the link speed or to set and report auto-negotiated speeds. FIG. 3 depicts the auto-negotiation signal waveforms for these three signals and the SLINK signal.

When CAUTONEG is de-asserted low, the CSPEED and CDUPLEX pins determine the link configuration. Both CSPEED and CDUPLEX pins have weak pull-ups, giving a default configuration of full duplex 100 Base-TX when left unconnected.

The rising edge of CAUTONEG is used to latch the values of the CSPEED and CDUPLEX pins into the auto-negotiation logic. The external controller must stop driving these pins within 1200 ms (maximum) after CAUTONEG is asserted high.

The PHY will commence negotiation as soon as CAUTONEG is asserted. The final 750 ms (minimum) of an auto-negotiation are to allow a hysteresis timer to ensure the link has remained stable for a reasonable time. During this time the PHY drives the CSPEED and CDUPLEX pins to indicate the link configuration. The external controller latches the values of these two pins on the rising edge of the SLINK pin.

The external controller should not attempt to start driving either CSPEED or CDUPLEX while CAUTONEG is asserted high.

Table 1 summarizes the meanings of the values latched in from the CSPEED and CDUPLEX pins when auto-negotiation has commenced.

TABLE 1

| CSPEED | CDUPLEX | 10Mbps HDX | 10Mbps FDX | 100Mbps HDX | 100Mbps FDX |
| --- | --- | --- | --- | --- | --- |
| 1 | 1 | Ye | Yee | Yes | Yes |
| 1 | 0 | Yes | Yes | Yes | No |
| 0 | 1 | Yes | Yes | No | No |
| 0 | 0 | Yes | No | No | No |

At initial power up the PHY will perform an internal reset. No external reset circuitry is required. However operation of the 10/100 PHY is not specified for 50 milliseconds (ms) after power up.

During operation, a full reset of the device can be performed by taking the MRST# pin low for a duration of not less than 50 microseconds (ets). Correct operation of the device is not guaranteed for a duration of 50 ms after the MRST# pin is de-asserted high.

The JTAG block includes a conventional JTAG port and is compliant with IEEE standard 1149.1; the JTAG test access port is comprised of five pins that are used to interface serially with the device and the board on which it is installed for boundary-scan testing.

The MII Management block allows the PHY to perform various MII functions, such as, for example, but not limited to, read and write control and interrupt control. The MII Management block also includes a plurality of registers for containing standard MII information and a plurality of registers for other uses. FIG. 4 depicts a presently preferred register map for the PHY of the present invention. The eight registers in the upper portion of FIG. 4 are the generic registers mandated by the Mul specification. The registers shown with a "TX" prefix are T1 specific registers. There may also be other registers employed by the PHY of the present invention. All other registers read as zeros.

By asserting the CLOOPBK# pin on the device, or by setting the LOOPBK bit in the generic control register (GEN_ctl), the transmit circuit of the PHY is looped back to the corresponding receive circuit, as close to the twisted pair I/O pins as possible.

The IEEE 802.3u MII serial protocol allows for up to 32 different PMDs, with up to 32 (16-bit wide) internal registers in each device. The 10/100 Base-T PHY implements a plurality of internal registers, some of which are hardwired.

The default or IDLE state of the two wire MII is a logic one. All tristate drivers will be disabled and the PHY's pull-up resistor will pull the MDIO line to a logic one. Prior to initiating any other transaction, the station management entity sends a preamble sequence of 32 contiguous logic one bits on MDIO with 32 corresponding cycles on MDCLK to provide the PHY with a pattern that it can use to establish synchronization. A PHY observes a sequence of 32 contiguous one bits on MDIO with 32 corresponding cycles on MDCLK before it responds to any other transactions. FIG. 5A depicts the frame format for a MII read. FIG. 5B depicts the frame format for a MII write. A brief description of these MII format fields is as follows.

Start Delimiter

The start of a frame is indicated by a 01 pattern. This pattern assures transitions from the default logic one line state to zero and back to one.

Operation Code

The operation code for a Read is 10, while the code for a write is 01.

PHY Address

The PHY address is 5 bits allowing 32 unique PHY addresses. The first PHY address bit transmitted and received is the MSB of the address. The 10/100 BASE-T PHY address is set using the CDEVSEL0-4 pins.

Register Address

The Register address is 5 bits allowing 32 individual registers to be addressed within each PHY.

Turn-around

An idle bit time during which no device actively drives the MDIO signal shall be inserted between the register Address field and the Data field of a read frame in order to avoid contention. During a read frame the PHY drives a zero bit onto MDIO for the bit time following the idle bit and preceding the Data field. During a write frame this field consists of a one bit followed by a zero bit.

Data

The Data field is 16 bits. The first data bit transmitted and received is the MSB of the data payload.

Quiescent/Interrupt Enable Cycles

The Quiescent Cycle is the cycle following the data transfer in which both the MAC Controller and the PHYs will not drive the MDIO pin. On the following rising edge of MDCLK after the Quiescent cycle while the MDC is also high, the MDIO may be driven LOW by the PHY to indicate that a PHY interrupt is pending.

Figure 6:
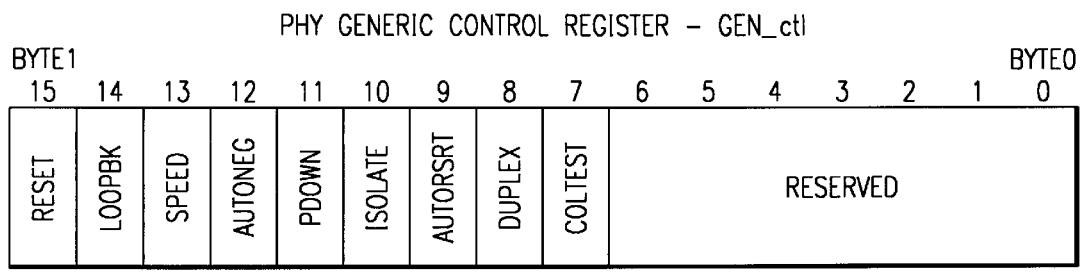
FIG. 6 depicts a simplified diagram of the bit positions and signal names associated with each bit position for the generic control register, GEN_ctl.

FIG. 6 depicts the bit positions and signal names associated with each bit position for the generic control register, GEN_ctl. Table 2 illustrates the generic control register bits, signal names and functions.

TABLE 2

| Bit | Name | Function |
|---|---|---|
| 15 | RESET | PHY Reset: Writing a one to this bit will cause the PHY to be reset and all registers except GEN_ctl to be reset to their default values. RESET is self-clearing - it will return a value of one when read until the internal reset is complete (which will take no longer than 500ms). Writing a zero to RESET to zero (default) has no effect. This bit is self-clearing and defaults to zero.<br>NOTE: This operation may interrupt data communications. |
| 14 | LOOPBK | Loopback: This bit enables/disables internal loopback within the PHY device. When LOOPBK is set to one (default), data is internally wrapped within the PHY and does not appear on the network. When LOOPBK is cleared to zero, data is transmitted to and received from the network. Whilst the PHY is in loopback all network lines are placed in a non-contentious state.<br>The value read as the LOOPBK bit is the logical OR of the register bit and the (active low) CLOOPBK# pin (external enable). |
| 13 | SPEED | Speed Select: Link speed can be selected via either the Auto-negotiation process, or manual speed selection. The default value of this bit is one. Manual speed selection is available when Auto-negotiation has been disabled. The speed is determined either by the value of this bit (when AUTONEG is zero) or the value of the CSPEED pin (when AUTONEG is one and the CAUTONEG pin is low). When Auto-negotiation is disabled, setting SPEED to one (default) configures the PHY for 100Mbps operation, and clearing SPEED to zero configures PHY for 10Mbps operation.<br>The value read from the SPEED bit reflects the currently selected speed mode, whatever the source of the configuration may be (i.e., this bit, the CSPEED pin or the result of a negotiation). |
| 12 | AUTONEG | Auto-negotiation Enable: This bit enables/disables the Auto-negotiation process. When AUTONEG is zero, the link shall be configured via the DUPLEX and SPEED bits, and the PHY will implement the appropriate link integrity test.<br>When AUTONEG is set to one (default), Auto-negotiation is enabled and the PHY will engage in the Auto-negotiation process when a LINk FAIL condition is detected or the AUTORSRT bit is set. The link should not be treated as valid until the AUTOCMPLT bit and LINK bit both become set to one as Auto-negotiation may complete having found no common line configuration.<br>The value read as the AUTONEG bit is the logical OR of the register bit and the (active low) CAUTONEG pin (external disable). |
| 11 | PDOWN | Power-down: When PDOWN is set to one, the PHY is placed in a low power consumption state. The time required for the PHY to power up after this bit is cleared can vary considerably, primarily based on whether a crystal or crystal oscillator is connected to XTAL1/XTAL2. It is good practice to set RESET after this time to ensure the PHY is in a valid state (this is unlikely to be necessary when a crystal oscillator is used). The default value of PDOWN is zero.<br>The value read as the PDOWN bit is the logical OR of the register bit and the (active low) CPWRDOWN# pin (external enable). |
| 10 | ISOLATE | Isolate: The function of ISOLATE is differs depending on whether the PHY is in Repeater mode or Node mode (determined by the REPEATER bit in TLPHY_ctl).<br>In Node mode, when ISOLATE is set to one (default), the PHY will electrically isolate its data paths from the MII. In this state is will not respond to MTXD0-3, MTXEN, and MTXER inputs, and will present a high impedance on its MTCLK, MRCLK, MRXDV, MRXER, MRXD0-3 and MCOL outputs. It will however still respond to management frames on MDIO and MDCLK.<br>In Repeater mode, when ISOLATE is set to one (default) the PHY will present a high impedance on its MRCLK, MRXDV, MRXER and MRXD0-3 outputs only.<br>The value read as the ISOLATE bit is the logical AND of the register bit and the (active low) CISOLATE# pin (external disable). |
| 9 | AUTORSRT | Restart Auto-negotiation: If Auto-negotiation has been enabled by setting AUTONEG to one, the Auto-negotiation process can be restarted by setting AUTORSRT to a one. AUTORSRT is self clearing, and the PHY shall return a value of one in this bit until Auto-negotiation FLP data burst transmission has been initiated. When AUTONEG is cleared to zero, AUTORSRT will read as zero. The default value of AUTORSRT is zero. |
| 8 | DUPLEX | Duplex Mode: Duplex mode can be selected via either the Auto-negotiation process, or manual duplex selection.<br>Manual duplex selection is available when Auto-negotiation has been disabled. The duplex configuration is determined either by the value of this bit (when AUTONEG is zero) or the value of CDUPLEX pin (when AUTONEG is one and the CAUTONEG pin is low). When Auto-negotiation is disabled, setting DUPLEX to one configures the PHY |

TABLE 2-continued

| Bit | Name | Function |
|---|---|---|
| | | for full duplex operation, and clearing SPEED to zero (default) configures the PHY for half duplex operation. The value read from the DUPLEX bit reflects the curently selected duplex mode, whatever the source of the configuration may be (i.e., this bit, the CDUPLEX pin or the result of a negotation). |
| 7 | COLTEST | Collision Test Mode: When COLTEST is set to one and LOOPBK is set to one, the PHY will assert the collision detect signal MCOL whenever transmit enable MTXEN is asserted. The default value of COLTEST is zero. |
| 6 thru 0 | | Reserved: Read and write as zero |

Figure 7:
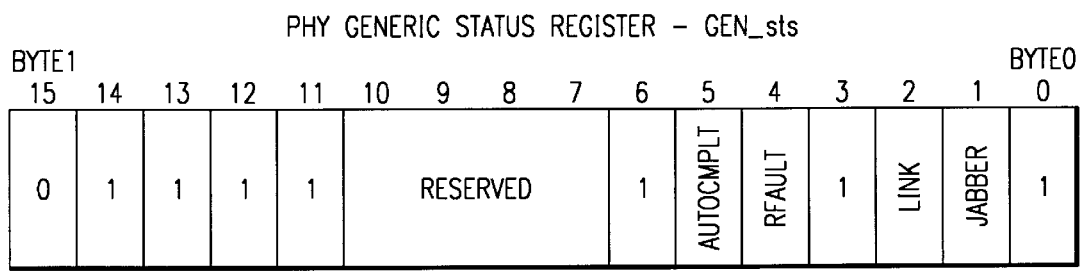
FIG. 7 depicts a simplified diagram of the bit positions and signal names associated with each bit position for the generic status register, GEN_sts.

FIG. 7 depicts the bit positions and signal names associated with each bit position for the generic status register, GEN_sts. Table 3 illustrates the generic status register bits, signal names and functions.

TABLE 3

| Bit | Name | Function |
|---|---|---|
| 15 | 0 | 100BASE-T4 Ability: Not supported. |
| 14 | 1 | 100BASE-TX Full-Duplex Ability: Supported by this PHY. |
| 13 | 1 | 100BASE-TX Half-Duplex Ability: Supported by this PHY. |
| 12 | 1 | 10BASE-T Full-Duplex Ability: Supported by this PHY. |
| 11 | 1 | 10BASE-T Half-Duplex Ability: Supported by this PHY. |
| 10 thru 7 | | Reserved: Read and write as zero |
| 6 | 1 | MF Preamble Suppression: This PHY will accept management frames with preamble suppressed. Management frames sent over MDIO do not need to be preceded by the preamble pattern of 32 one's. |
| 5 | AUTOCMPLT | Auto-Configuration Complete: When AUTOCMPLT is read as one, it indicates that the Auto-negotiation process has completed and the values of registers AN_adv, AN_lpa, AN_exp and AN_np are valid If Auto-negotiation is in progress, or has been restarted and AUTORSRT is still set to one, or has been disabled by clearing AUTONEG to zero, the AUTOCMPLT bit will read as zero. |
| 4 | RFAULT | Remote Fault: The RFAULT bit will be set to one during Auto-negotiation if an error in the protocol is detected and negotiation is restarted. If the negotiation involved the exchange of multiple Next Pages this bit will indicate that the first of those pages needs to be reloaded into AN_np due to the restart. RFAULT is latched (held) as one until the register is read. The default value of RFAULT is zero. |
| 3 | 1 | Auto-negotiation Ability: This PHY supports Auto-negotiation. |
| 2 | LINK | Link Status: In general, when LINK is set to one, the PHY is reporting a good link is available to the link partner for exchange of data. The value of LINK is latched (held) until the register is read. The default value of LINK is one. In 10BASE-T mode LINK is set to one when the PHY has determined that a valid 10BASE-T link is established. When read as a zero it indicates that the link is not valid. The PHY implements the standard 10BASE-T link integrity test state machine. Linkpulses are expected to be seen every 8–24ms to maintain a good link. If no linkpulses are seen for over 100ms the link invalid state is entered, and this bit is cleared. If AUTONEG is not set then the bit will be set again after seven consecutive, correctly timed linkpulses are received. In 100BASE-X mode the LINK bit is set once the descrambler has locked onto the incoming data stream, and has remained locked for a minimum of 330$\mu$s. If AUTONEG is set then the link becoming invalid causes the auto-negotiation process to restart. |
| 1 | JABBER | Jabber detect: The Jabber function is not specified for 100BASE-X PHYs so JABBER will always read as zero (default) when the PHY is operating in its 100Mbps mode. When JABBER is read as one it indicates a 10BASE-T jabber condition has been detected. JABBER is latched (held) as one until the register is read. The jabber condition occurs when a single packet transmission exceeds 20ms (note this cannot happen through normal TLAN operation). In the jabber condition all transmit requests will be |

TABLE 3-continued

| Bit | Name | Function |
|---|---|---|
| | | ignored, the MCOL pin will be asserted high and collision detection will be disabled as will the internal loopback of transmit data (when in half duplex mode). The jabber condition will persist for 576m–628ms after the de-assertion of MTXEN before packet transmission may recommence. |
| 0 | 1 | Extended Capability: This PHY implements an extended register set. |

Figure 8:
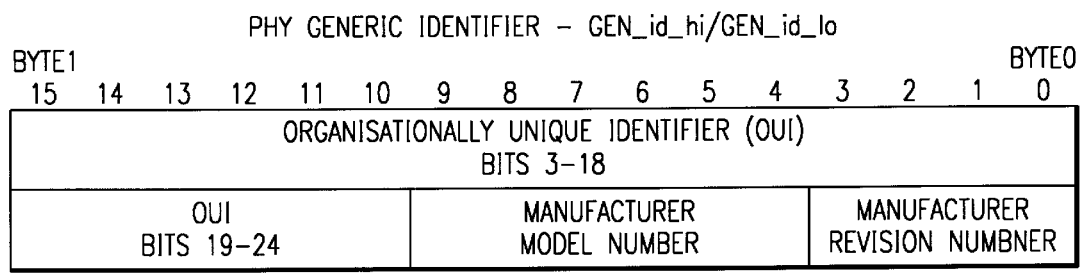
FIG. 8 depicts a simplified diagram of the bit positions and signal names associated with each bit position for the generic identifier register, GEN_id_hi/GEN_id_lo.

FIG. 8 depicts the bit positions and signal names associated with each bit position for the generic identifier register, GEN_id_hi/GEN_id_lo.

Figure 9:
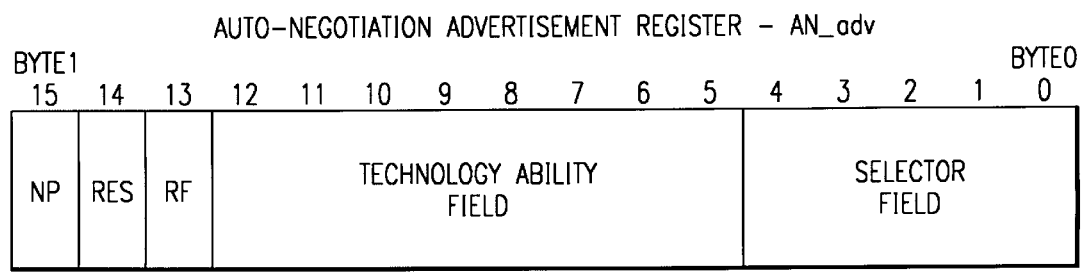
FIG. 9 depicts a simplified diagram of the bit positions and signal names associated with each bit position for the auto-negotiation advertisement register, AN_adv.

FIG. 9 depicts the bit positions and signal names associated with each bit position for the auto-negotiation advertisement register, AN_adv. Table 4 illustrates the auto-negotiation advertisement register bits, signal names and functions.

The Link Partner Ability register, AN_lpa, has three different formats depending on when the page has been received. The first page received from the Link Partner is always in the Base Page encoding and is used by the PHY for auto-configuration. If the Link Partner supports Next Page exchange then subsequently received pages can be in either Message Page or Unformatted Page encodings, which are determined by the value of the LPMP bit. Table 5 illustrates the base page register bits, signal names and functions. Table 6 illustrates the message page register bits,

TABLE 4

| Bit | Name | Function |
|---|---|---|
| 15 | NP | Auto-negotiation Next Page: When NP is set to one the Auto-negotiation process will indicate to the Link Partner that the PHY wishes to exchange Next Pages. The capability of the Link Partner to exchange Next Pages can be determined by the value of the LPNPABLE bit in register AN_exp. If the Link Partner is capable of Next Page exchange and has also requested an exchange by setting the LPNP bit to one in the AN_lpa register, then the Auto-negotiation process will wait until the Next Page is written to the AN_np register, and the Link Partner has also had its Next Page loaded. The Link Partner's Next Page will then be received into the AN_lpa register. A consequence of this process is that the PHY will fail to complete Auto-negotiation if for some reason the PHY and its Link Partner agree to exchange Next Pages, but the Link Partner never sends its Next Page. It is advised that a software timeout is implemented which will force re-negotiation with NP cleared to zero to escape this deadlock situation. The default value of NP is zero. |
| 14 | | Acknowledge: Reserved for internal use of the Auto-negotiation process. Write as zero, read as Don't Care. |
| 13 | RF | Remote Fault: When RF is set to one the PHY will indicate a Remote Fault condition to its Link Partner. The type of fault as well as the criteria and method of fault detection is PHY specific. The default value of RF is zero. |
| 12 thru 9 | Technology Ability Field | Auto-negotiation Advertised Technology Ability: This 8-bit value is sent to the Link-Partner to indicate the abilities of the TLAN PHY. Unsupported ab/ilities cannot be advertised, which for this PHY means bits 12 thru 9 are read-only and always read as zero. The default value of the Technology Ability Field is to advertise all available capabilities (0000.1111). |
| 8 | | 100BASE-TX Full duplex: Set to one to advertise availability to the Link Partner. |
| 7 | | 100BASE-TX Half duplex: Set to one to advertise availability to the Link Partner. |
| 6 | | 10BASE-T Full duplex: Set to one to advertise to availability the Link Partner. |
| 5 | | 10BASE-T Half duplex: Set to one to advertise to availability the Link Partner. |
| 4 thru 0 | Selector Field | Auto-negotiation Selector Field Code: This field has a default value of 0001, meaning the PHY only supports IEEE 802.3 format link code words. |

Figure 10A:
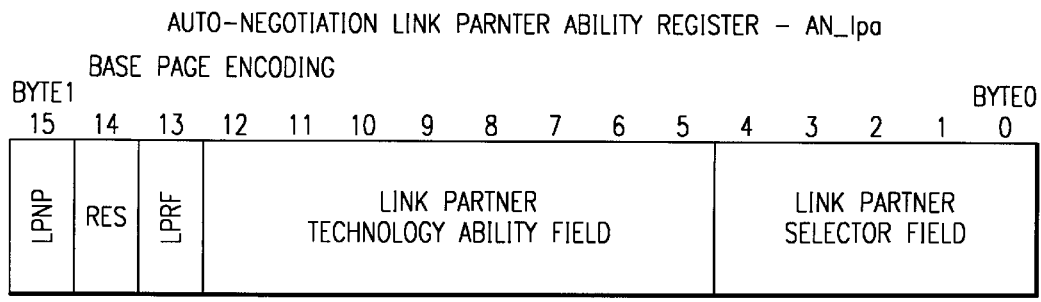
FIGS. 10A, 10B, and 10C depict simplified diagrams of the bit positions and signal names associated with each bit position for the auto-negotiation link partner ability register, AN_lpa.
Figure 10B:
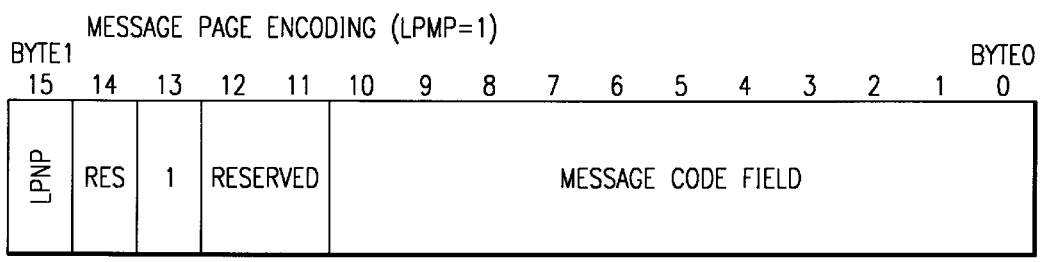
Figure 10C:
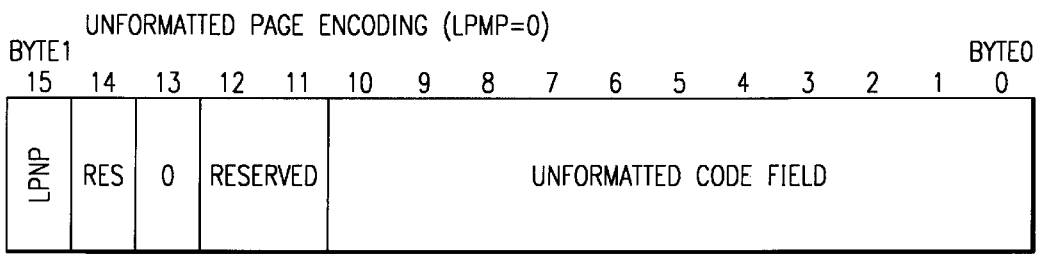

FIGS. 10A, 10B, and 10C depict the bit positions and signal names associated with each bit position for the auto-negotiation link partner ability register, AN_lpa.

signal names and functions. Table 7 illustrates the unformatted page register bits, signal names and functions. Table 8 illustrates the message code fields for Table 4.

TABLE 5

| Bit | Name | Function |
|---|---|---|
| 15 | LPNP | Link Partner Next Page: When LPNP is set to one the Link Partner is indicating that it wishes to exchange a Next Page. See the description of NP in register AN_adv for more information on Next Page exchange. |
| 14 | | Acknowledge: Reserved for internal use of the Auto-negotiation process. Write as zero, read as Don't Care. |
| 13 | LPRF | Link Partner Remote Fault: When this bit is set to a one the Link Partner is reporting a remote fault condition. |
| 12 thru 10 | Link Partner Technology Ability Field | Link Partner Technology Ability Field: This 8-bit value specifies which capabilities the Link Partner PHY implements. Bits 12 thru 10 are reserved for future IEEE defined abilities and cannot be defined at this time (except that this PHY does not support them). |
| 9 | | 100BASE-T4: Set to one if supported by the Link Partner. |
| 8 | | 100BASE-TX Full duplex: Set to one if supported by the Link Partner. |
| 7 | | 100BASE-TX Half duplex: Set to one if supported by the Link Partner. |
| 6 | | 10BASE-T Full duplex: Set to one if supported by the Link Partner. |
| 5 | | 10BASE-T Half duplex: Set to one if supported by the Link Partner. |
| 4 thru 0 | Link-Partner Selector Field | Link Partner Selector Field: This 5-bit value encodes the format of this register. The PHY only supports IEEE 802.3 format fields (as detailed in bits 12 thru 5 above), code 00001. (The only other currently specified IEEE value is 00010, for IEEE 802.9a multimedia frames). |

TABLE 6

| Bit | Name | Function |
|---|---|---|
| 15 | LPNP | Link Partner Next Page: When LPNP is set to one the Link Partner is indicating that it wishes to exchange a further Next Page. See the description of NP in register AN_adv for more information on Next Page exchange. |
| 14 | | Acknowledge: Reserved for internal use of the Auto-negotiation process. Read as Don't Care. |
| 13 | LPMP = 1 | Link Partner Message Page: When LPMP is set to one, register AN_lpa contains a Message Page. |
| 12 | | Acknowledge 2: Reserved for internal use of the Auto-negotiation process. Read as Don't Care. |
| 11 | | Toggle: Reserved for internal use of the Auto-negotiation process. Read as Don't Care. |
| 10 thru 0 | Message Code Field | Message Code: 11-bit Message Code. See Message Code Field Values for descriptions of the currently defined IEEE Message Codes. |

TABLE 7

| Bit | Name | Function |
|---|---|---|
| 15 | LPNP | Link Partner Next Page: When LPNP is set to one the Link Partner is indicating that it wishes to exchange a further Next Page. See the description of NP in register AN_adv for more information on Next Page exchange. |
| 14 | | Acknowledge: Reserved for internal use of the Auto-negotiation process. Read as Don't Care. |
| 13 | LPMP = 0 | Link Partner Message Page: When LPMP is cleared to zero, register AN_lpa contains an Unformatted Page. |
| 12 | | Acknowledge 2: Reserved for internal use of the Auto-negotiation process. Read as Don't Care. |
| 11 | | Toggle: Reserved for internal use of the Auto-negotiation process. Read as Don't Care. |
| 10 thru 0 | Unformatted Code Field | Unformatted Code: 11-bit user code. The format of this code is determined by the preceding Message Code. See Message Code Field Values. |

TABLE 8

| Message Code # | Bit 10 thru Bit 0 | Message Code Description |
|---|---|---|
| 0 | 00000000000 | Reserved for future Auto-negotiation use |
| 1 | 00000000001 | Null Message: The Null Message code shall be transmitted during Next Page exchange when the local devjce has no further messages to transmit and the Link Partner is still transmitting valid Next Pages. |
| 2 | 00000000010 | Technology Ability Extension Code 1 (one UP with Technology Ability Field follows): This Message Code is reserved for future expansion of the Technology Ability Field and indicates that a defined user code with a specific Technology Ability Field encoding follows. |
| 3 | 00000000011 | Technology Ability Extension Code 2 (two UPs with Technology Ability; Fields follow): This Message Code is reserved for future expansion of the Technology Ability Field and indicates that two defined user codes with specific Technology Ability Field encoding follow. |
| 4 | 00000000100 | Remote Fault Number Code (one UP with Binary coded Remote Fault follows): This Message Code shall be followed by a single user code whose encoding specified the type of fault that has occurred. The following user codes are defined:<br>  0    RF Test: Used to test Remote Fault operation.<br>  1    Link Loss<br>  2    Jabber<br>  3    Parallel Detection Fault: Sent to identify when PDFAULT is set. |
| 5 | 00000000101 | Organizationally Unique Identifier Tagged Message: The OUI Tagged Message shall consist of a singled message code of 0000.0000.0101 followed by 4 user codes defined below. The numbers indicate where each bit of the 24-bit OUI should be stored in the 11-bit user code. Bits 8-0 of the 3rd user code and the fourth and final user code shall contain a user defined user code value that is specific to the OUI transmitted.<br><br>     Bit 10    User Code Encoding of Organizationally Unique Identifier    Bit 0<br>  1st  23 22 21 20 19 18 17 16 15 14  13<br>  2nd  12 11 10 9 8 7 6 5 4 3  2<br>  3rd  1 0  User Defined User Code Specific to OUI<br>  4th  User Defined User Code Specific to OUI |
| 6 | 00000000110 | PHY Identifier Tag Code The PHY ID tag code message shall consist of a single message code of 0000.0000.0110 followed by 4 user codes defined below. The numbers indicate where each bit of the 32-bit PHY ID (stored in GEN_id_hi register 0x2:15-0 and GEN_id_lo register 0x3:15-0) should be stored in the 11-bit user code. Bit 0 of the 3rd user code and the fourth and final user code shall contain a user defined user code value that is specific to the PHY ID transmitted.<br><br>     Bit 10    User Code Encoding of PHY ID    Bit 0<br>  1st  0x2 15, 0x2 14, 0x2 13, 0x2 12, 0x2 11, 0x2 10, 0x2 9, 0x2 8, 0x2 7, 0x2 6, 0x2 5<br>  2nd  0x2 4, 0x2 3, 0x2 2, 0x2 1, 0x2 0, 0x3 15, 0x3 14, 0x3 13, 0x3 12, 0x3 11, 0x3 10<br>  3rd  0x3 9, 0x3 8, 0x3 7, 0x3 6, 0x3 5, 0x3 4, 0x3 3, 0x3 2, 0x3 1, 0x3 0, UD UC<br>  4th  User Defined User Code Specific to PHY ID |
| 2047 | 11111111111 | Reserved for future Auto-negotiation use |

The use of Next Pages are summarized below:

Both the PHY and the Link Partner indicate Next Page ability for either to commence exchange of Next Pages.

If both devices are Next Page capable, then both devices must send at least one Next Page.

Next Page exchange continues until neither device on a link has more pages to transmit as indicated by the LPNP/NP bits. A Message Page with a null Message Code Field value is sent if the device has no other information to transmit.

A Message Code can carry either a specific message or information that defines how any following Unformatted Page(s) should be interpreted.

If a Message Code references Unformatted Pages, the Unformatted Pages immediately follow the referencing Message Code in the order specified by the Message Code.

Unformatted Page users are responsible for controlling the format and sequencing for their Unformatted Pages.

Figure 11:
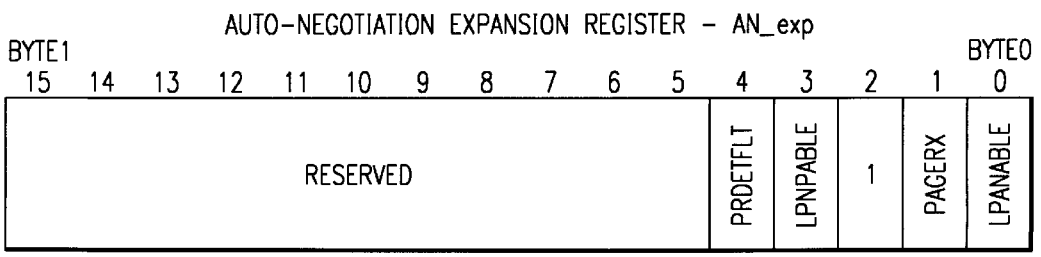
FIG. 11 depicts a simplified diagram of the bit positions and signal names associated with each bit position for the auto-negotiation expansion register, AN_exp.

FIG. 11 depicts the bit positions and signal names associated with each bit position for the auto-negotiation expansion register, AN_exp. Table 9 illustrates the auto-negotiation expansion register bits, signal names and functions.

FIG. 13 depicts the bit positions and signal names associated with each bit position for the PHY identifier high/low register, TLPHY_id. The TLAN PHY identifier high/low register is a hardwired 16 bit register that contains a TI assigned identifier code for the TLAN PHY/PMIs. An additional identifier is required to identify non-IEEE 802.3 PHY/PMIs, which are not otherwise supported by the IEEE 802.3u MII specification. The identifier code for the internal 10/100 BASE-T PHY is 0x0003.

TABLE 9

| Bit | Name | Function |
|---|---|---|
| 15 thru 5 | | Reserved: Read and write as zero. |
| 4 | PDFAULT | Parallel Detection Fault: The PDFAULT bit is set to one during Auto-negotiation if the PHY detects a valid 10BASE-T or 100BASE-TX link which then fails within 500–1000ms, or if both the 10BASE-T and 100BASE-TX link monitors report a good link. PDFAULT is latched (held) until this register is read, when it is cleared to zero (default). |
| 3 | LPNPABLE | Link-Partner Next Page Able: When LPNPABLE is set to one, the Link-Partner is indicating that it implements the Auto-negotiation Next Page ability. The default value of LPNPABLE is zero. |
| 2 | 1 | Next Page Able: This PHY supports Auto-negotiation Next Page exchange. |
| 1 | PAGERX | Page Received: The PAGERX bit is set to one when a new Link Code Word has been received and stored in the AN_lpa register. PAGERX is latched (held) until this register is read, when it is cleared to zero (default). |
| 0 | LPANABLE | Link-Partner Auto-Negotiation Able: When LPANABLE is set to one the PHY has received Link Code Word(s) from the Link Partner during Auto-negotiation. The value of LPANABLE is retained after Auto-negotiation completes, and will be re-evaluated only during a subsequent re-negotiation (whether caused by a LINK FAIL condition or a forced restart) or PHY reset. The default value of LPANABLE is zero. |

FIG. 12 depicts the bit positions and signal names associated with each bit position for the auto-negotiation next page transmit register, AN_np. Table 10 illustrates the auto-negotiation next page transmit register bits, signal names and functions.

FIG. 14 depicts the bit positions and signal names associated with each bit position for the PHY control register, TLPHY_ctl. Table 11 illustrates the PHY control register bits, signal names and functions.

TABLE 10

| Bit | Name | Function |
|---|---|---|
| 15 | NP | Next Page: When a Next Page with NP set to one is transmitted, the I Partner is informed that yet another Next Page is to be transmitted. Message Code Field Values. The default value of NP is zero. |
| 14 | | Acknowledge: Reserved for internal use of the Auto-negotiation pro Write as zero, read as Don't Care. |
| 13 | MP | Message Page: When MP is set to one, AN_np contains a Message code field. When MP is cleared to zero, AN_np contains an Unform Page code field. See Message Code Field Values. The default value of is zero. |
| 12 | | Acknowledge 2: Reserved for internal use of the Auto-negotiation pro Write as zero, read as Don't Care. |
| 11 | | Toggle: Reserved for internal use of the Auto-negotiation process. Wri zero, read as Don't Care. |
| 10 thru 0 | Message/ Unformatted Code Field | Message or Unformatted Code Field: See Message Code Field Values. T default value of the code field is 000.0000.0001, the Null Message code. |

TABLE 11

| Bit | Name | Function |
| --- | --- | --- |
| 15 | IGLINK | Ignore Link: When IGLINK is cleared to zero (default), the 10BASE-T P expects to receive link pulses from the link partner (hub, switch, etc.) and clear the LINK bit in the GEN_sts register to zero if they are not pres When IGLINK is set to one the internal link integrity test state machin forced to stay in the LINK GOOD state even when no link pulses are b received, and also causes the LINK bit to stay set to one. |
| 14 | SWAPOL | Swap Polarity: When enabled via the MANCONF bit, writing a one SWAPOL will cause the PHY to use the reverse of the IEEE 802.3 standa polarity for the ARCVP/ARCVN 10BASE-T receiver input pair. This is us to compensate for a cable in which the receive pair have been incorrect wired. When SWAPOL is set to zero or MANCONF is set to zero, the PHY w attempt to automatically sense and correct for an inverted 10BASE-T recei pair. The default value of SWAPOL is zero. |
| 13 | MANCONF | Manual Configuration: Writing a one to MANCONF enables manu configuration of the PHY. The SWAPOL bit has no effect unless this bit set. The default value of MANCONF is zero. |
| 12 | SQEEN | SQE (Signal Quality Error or "Heartbeat") Enable: When SQEEN is set one the 10BASE-T PHY (when selected) will perform the SQE test function the end of packet transmission. The default value of SQEEN is zero. The Signal Quality Error test provides an internal simulated collision test collision detect circuit integrity after a transmission. In 10BASE-T mo the SQE test asserts MCOL between 600ns–1600ns after the last posit edge of a frame is transmitted, with the collision event lasting for betwe 500ns–1500ns. |
| 11 | MTEST | Manufacturing Test: When MTEST is set to one the PHY is placed i manufacturing test mode. Manufacturing test mode is reserved for Te Instruments Manufacturing test only. The default value of MTEST is ze Operation of the PHY and MII registers is undefined when this bit is set. |
| 10 | FIBRE | 100BASE-FX Mode: When FIBRE is set to one the PHY will disable cipher stream scrambler and descrambler. The default value of FIBRE zero. |
| 9 | FEFEN | Far End Fault Indication Enable: When both FEFEN and FIBRE are se one the PHY will transmit the Far End Fault Indication symbol stre (consisting of 84 one's and 1 zero) whenever the 100BASE-FX signal detec de-asserted. Also at this time, the FEFI bit in TLPHY_sts will become se one. The FEFI system is specified for use in 100BASE-FX Fibre applicati only. The default value of FEFEN is zero. |
| 8 | NOENDEC | No Encode/Decode: When NOENDEC is set to one the 100BASE-X PHY w bypass its 4B5B encoder and decoder. Instead it will take the 5-bit co presented on MTXD0-3 and MTXER (msb) as transmit data, and w present the received 5B code groups on MRXD0-3 and MRXER (msb). T default value of NOENDEC is zero. The value read as the NOENDEC bit is the logical OR of the register and the (active low) CPASS5B# pin (external enable). |
| 7 | NOALIGN | No Symbol Alignment: When NOALIGN is set to one the 100BASE-X recei symbol alignment block is bypassed and the 5-bit descrambled recei symbols are passed directly to the 5B4B decoder. |
| 6 | DUPONLY | Duplex LED: When DUPONLY is set to one the LDUPCOL# LED driv will only indicate the duplex mode the PHY is operating in, and will r indicate network collisions. The default value of DUPONLY is zero. |
| 5 | REPEATER | Repeater Mode Enable: When REPEATER is set to one the PHY will assert MCRS in response to transmit activity. Also, the ISOLATE bit in GEN_ctl register will only tristate the MRCLK, MRXD0-3, MRXDV a MRXER pins. The default value of REPEATER is zero. |
| 4 | RXRESET | 100BASE-X Receive Reset: Writing a one to this self-clearing bit allows t 100BASE-X receive logic (descrambler, aligner and SB4B decoder) to be re without affecting other parts of the PHY. The default value of RXRESET zero. |
| 3 | NOLINKP | Disable Linkpulse Transmission: When NOLINKP is set to one a IGLINK is set to one the PHY will not transmit any form of link pulses. 10BASE-T applications the Link Partner will not detect a good link and will not transmit any data, unless it is not implementing the Link Integ Test (e.g., a TLAN PHY with IGLINK set to one). Auto-negotiation should disabled by clearing AUTOENB to zero when NOLINKP is set as no Au negotiation fast link pulses will be transmitted to the Link Partr NOLINKP has no effect on the PHY if IGLINK is cleared to zero. default value of NOLINKP is zero. This mode of operation is provided application test purposes. |
| 2 | NFEW | Not Far End Wrap: This bit only has meaning when the LOOPBK bit of t GEN_ctl is set to one. Writing a one to NFEW will cause the PHY to wr the MTXD input data to the MRXD output just after the MII interfac Writing a zero to NFEW will cause the PMI to wrap the TX data to the just before the network transceiver interface (either 10BASE-T or 100BAS |

TABLE 11-continued

| Bit | Name | Function |
|---|---|---|
| | | TX). When NFEW is set to one preamble will be wrapped witho degradation (in normal operation the PHY may lose some preamble b during initial clock recovery synchronization). The default value of NFEW zero. |
| 1 | INTEN | Interrupt Enable: Writing a one to INTEN allows the PHY to genera interrupts on the MII when the MINT bit is set to one. Writing a zero INTEN will prevent the PHY from generating any MII interrupts. INT does not disable test interrupts. The default value of INTEN is zero. |
| 0 | TINT | Test Interrupt: When TINT is set to one the PHY will generate interrupts the MII, irrespective of the value of the MINT and INTEN bits. TINT is be used for diagnostic test of the MII interrupt function. The default value TINT is zero. |

FIG. 15 depicts the bit positions and signal names associated with each bit position for the PHIY status register, TLPHY_sts. Table 12 illustrates the PHY status register bits, signal names and functions.

TABLE 12

| Bit | Name | Function |
|---|---|---|
| 15 | MINT | MII Interrupt. This bit indicates an MII interrupt condition. The MII interrupt request will be activated and latched (held) until this register is read. Writing to this bit has no effect. MINT is set to one when:<br>• PHOK changes state.<br>• LINK changes state, or is different from either the last read value or the current state of the link.<br>• SYNCLOSS becomes set to a one.<br>• FEFI becomes set to one.<br>• JABBER changes state.<br>• RFAULT becomes set to a one.<br>• PAGERX becomes set to a one.<br>• AUTOCMPLT changes state.<br>These interrupt sources are only active when MANCONF in TLPHY_ctl is set to one, and set MINT to one when:<br>• SIGDET changes state.<br>• POLOK changes state. |
| 14 | PHOK | Power High O.K.: When PHOK becomes set to one it indicates that the internal crystal oscillator circuit has begun to oscillate (and performed around 75 cycles). PHY sourced clocks (MRCLK and MTCLK) are not valid until at least the time that this bit is asserted. If a crystal is connected to XTAL1/XTAL2 rather than a crystal oscillator then the clocks may take up to 50ms to become stable, and the PHY will require the RESET bit to be set to ensure it is in a valid state. When PHOK is zero the PHY is not in a fully operational state. |
| 13 | POLOK | Polarity O.K: When POLOK is set to one (default) the 10BASE-T PHY is receiving valid (non-inverted) link pulses. If POLOK becomes cleared to zero, it indicates that a sequence of 7 consecutive inverted link pulses have been detected. POLOK is reset to one whenever a normal link pulse is received. |
| 12 | SIGDET | 100BASE-X Signal Detect: When SIGDET is set to one it indicates that the PHY is receiving valid 100BASE-X signaling. If the PHY is operating in fibre mode then this bit reflects the value on the FSDPIFSDN pins otherwise it indicates that the on-chip 100Mbps receiver equalizer has settled. |
| 11 | SYNCLOSS | 100BASE-TX Receive Descrambler Synchronization Loss: The 100BASE-TX descrambler expects to receive at least 12 consecutive IDLE symbols every 722$\mu$s. If these are not seen then SYNCLOSS is set to one, and the descrambler will attempt to re-synchronize itself to the incoming scrambled data stream. The value of SYNCLOSS is latched (held) high until this register is read. |

TABLE 12-continued

| Bit | Name | Function |
|---|---|---|
| 10 | FEFI | Far End Fault Indication: When enabled via the FEFEN bit in TLPHY_ctl, this bit will be set to one if the FEFI signaling sequence is being transmitted by the link partner. The value of FEFI is latched (held) high until this register is read. |
| 9 thru 0 | | Reserved: Read and write as zero |

Figure 16:
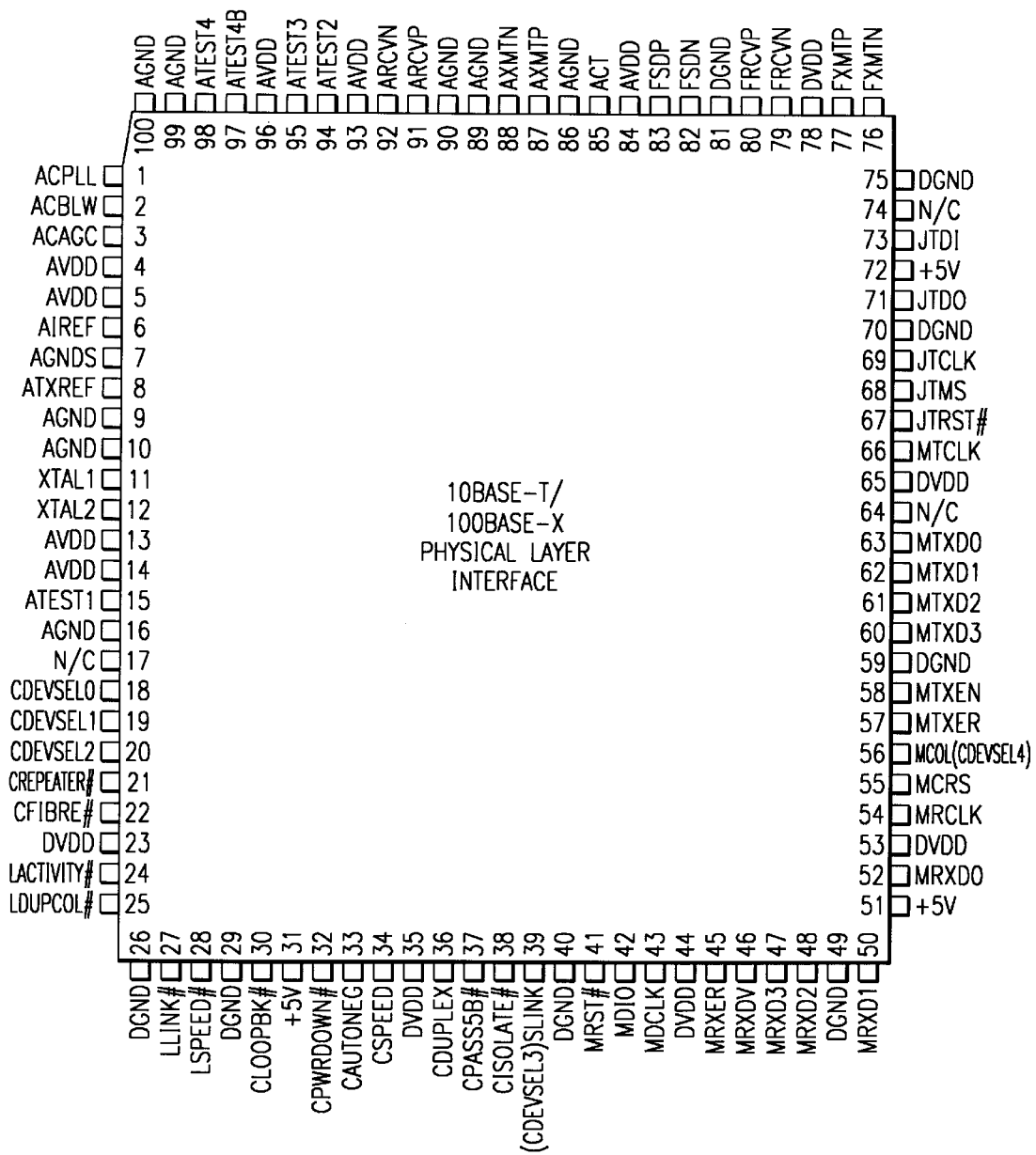
FIG. 16 depicts a simplified diagram of the pin positions and signal names associated with each pin position for the physical layer interface device of FIG. 1.

FIG. 16 depicts the pin positions and signal names associated with each pin position for the 10/100 PHY of the present invention. Tables 13A, 13B, 13C, 13D, 13E, 13F, 13G, 13H, and 13I illustrate the various pins, signal names and functions.

TABLE 13A

Network Interface Pins

| Pin | Name | Type | Function |
|---|---|---|---|
| 1 | ACPLL | an | P.L.L. capacitor: Capacitor required for an internal phase-locked loop. Value T.B.D. |
| 2 | ACBLW | an | B.L.W. Capacitor: Capacitor for the Baseline-Wander correction loop. Value T.B.D. |
| 3 | ACAGC | an | A.G.C. Capacitor: Capacitor for the Automatic Gain Control loop. Value T.B.D. |
| 4 | AVDD | supply | Power: Analog 3.3V supply connection. |
| 5 | AVDD | | |
| 6 | AIREF | an | Analogue Current Reference: An external resistor between this pin and analog ground sets the bias current for internal analogue circuits. Value T.B.D. but currently at 7500 Ohms +/− 1%. |
| 7 | AGNDS | supply | Ground: Independent ground connection for the internal device scribe seal. Connect to analog GND. |
| 8 | ATXREF | an | 100BASE-TX Transmit Reference: An external resistor between this pin and analog ground sets the 100 BASE-TX transmit amplitude. Value T.B.D. but currently at 2500 Ohms +/− 1% for U.T.P. |
| 9 | AGND | supply | Ground: Analog Ground connection. |
| 10 | AGND | | |
| 11 | XTAL1 | 3.3V | Crystal: Connect a 20MHz crystal and capacitor network between these pins or drive XTAL1. Alternatively an external crystal oscillator (with a maximum output of 3.3V) may be connected to these pins. |
| 12 | XTAL2 | an | |
| 13 | AVDD | supply | Power: Analog 3.3V Supply connection. |
| 14 | AVDD | | |
| 15 | ATEST1 | an | Analogue Test1: A T.I. analog test pin. Treat this pin as a no-connect (N/C). |
| 16 | AGND | supply | Ground: Analog Ground connection. |
| 17 | N/C | | No connect: Leave this pin unconnected. |

Key to Pin Types:
in     Input only pin
out    Output only pin
t/s     Tri-state I/O pin
o/d    Open Drain output pin
an     Analogue signal pin
supply    Power Supply or ground pin

TABLE 13B

External Configuration Pins

| Pin | Name | Type | Function |
|---|---|---|---|
| 18 | CDEVSEL0 | 3.3V In | MII Device Select Address bit 0: The value of CDEVSEL0-4 pins are latched into the MII Management Interface on the rising edge of MRST#. This allows a unique address to be assigned to the PHY in applications where multiple PHYs are in use. |
| 19 | CDEVSEL1 | | |
| 20 | CDEVSEL2 | | |
| 21 | CREPEATER# | 3.3V In | Repeater Mode Enable: This pin is logically OR-ed with the REPEATER bit in the TLPHY_ctl register to enables (active low)/disable repeater mode. |

TABLE 13B-continued

External Configuration Pins

| Pin | Name | Type | Function |
|---|---|---|---|
| 22 | CSERTEST# | 3.3V In | Reserved for TI Manufacturing Test. Connect to VDD via a pull-up resistor. In serial test mode, auto-negotiation is disabled and selecting 10Mbps mode will cause the PHY to power down. |
| 23 | DVDD | supply | Power: Digital 3.3V supply connection. |

TABLE 13C

LED Interface Pins

| Pin | Name | Type | Function |
|---|---|---|---|
| 24 | LACTIVITY# | 3.3V Out | Activity Indicator: This driver will light an attached LED in response to both receive and transmit activity within the PHY. |
| 25 | LDUPCOL# | 3.3V Out | Duplex/Collision Indicator: This driver will light an attached LED in response to a network collision when the PHY is in a half-duplex mode of operation. The LED will be lit continuously when the PHY is in a full-duplex mode. |
| 26 | DGND | supply | Ground: Digital Ground connection. |
| 27 | LLINK# | 3.3V Out | Link Status Indicator: This driver will ight an attached LED when the PHY has established a valid link with its partner. If auto-negotiation is enabled the driver will flash the LED during negotiation to indicate that it is attempting to establish a link. This is useful as a negotiation takes a minimum of 3 seconds (considerably longer if Next Page information is also being exchanged) and the user may be tempted to remove the cable if the link light does not come on immediately. The user will also be alerted to a network mis-configuration (where no common ability exists between the two link partners) by a continuously flashing LED. |
| 28 | LSPEED # | 3.3V Out | Link Speed Indicator: This driver will light an attached LED when the PHY has established a valid 100BASE-X link with its partner. |
| 29 | DGND | supply | Ground: Digital Ground connection. |

TABLE 13D

External Configuration Pins

| Pin | Name | Type | Function |
|---|---|---|---|
| 30 | CLOOPBK# | In | Loopback Enable: This pin enables (active low)/disables internal loopback within the PHY device and is equivalent to the LOOPBK bit in the GEN_ctl register except that the pin is Active LOW. |
| 31 | +5V | supply | Power: Digital 5V supply connection. |
| 32 | CPWRDOWN# | In | Power-down Enable: This pin enables (active low)/disables internal loopback within the PHY device and is equivalent to the PDOWN bit in the GEN_ctl register except that the pin is Active LOW. |
| 33 | CAUTONEG | In | Auto-negotiation Enable: This pin enables (active high)/disables auto-negotiation within the PHY device when the ANENABLE bit in the GEN_ctl register is set to one. The values of the CSPEED and CDUPLEX pins are latched into the Auto-negotiation logic on the rising edge of CAUTONEG and are used to set the advertised capabilities. |
| 34 | CSPEED | I/O | Speed Configuration: When CAUTONEG is low, this pin is logically OR-ed with the SPEED bit the GEN_ctl register to select either 10BASE-T (low) or 100BASE-X (high) mode. After a rising edge on CAUTONEG and a completed negotiation this pin will be driven with the negotiated speed. |
| 35 | DVDD | supply | Power: Digital 3.3V supply connection. |
| 36 | CDUPLEX | I/O | Duplex Configuration: When CAUTONEG is low, this pin is logically OR-ed with the DUPLEX bit the GEN_ctl register to select either half-duplex (low) or full-duplex (high) mode. After a rising edge on CAUTONEG and a completed negotiation this pin will be driven with the negotiated duplex. |

TABLE 13D-continued

External Configuration Pins

| Pin | Name | Type | Function |
|---|---|---|---|
| 37 | CPASS5B# | In | Pass-thru Mode Enable: When CPASS5B# is low, this pin is logically OR-ed with the NOENDEC bit in the TLPHY_ctl register to enable the 5B pass-thru mode. In this mode of operation the normal 4B5B encoding used in 100BASE-X is bypassed. The 5B code group to transmit is taken from MTXD0-3 and MTXER (msb). Receive data is descrambled and aligned and the resulting the 5B code presented on MRXD0-3 and MRXER (msb). |
| 38 | CISOLATE# | In | MII Interface Isolate Enable: This pin is logically AND-ed with the ISOLATE bit in the GEN_ctl register to enable (active low)/disable MII Isolate mode. When the PHY is in Node mode, isolating the MII causes the PHY to tristate MTCLK, MRCLK, MRXD0-3, MRXDV, MRXER, MCRS and MCOL and it will not respond to MTXEN. When the PHY is in Repeater mode only MRXCLK, MRXD0-3, MRXDV and MRXER are tristated, hence the CISOLATE# pin acts as an active high Receive Enable function. |

TABLE 13E

External Status Pins

| Pin | Name | Type | Function |
|---|---|---|---|
| 39 | SLINK (CDEVSEL3) | I/O | Link Status: When asserted hlgh thls pin indicates a good link has been established with the link partner. When auto-negotiation is enabled it also indicates that the CSPEED and CDUPLEX pins are being driven with the negotiated speed and duplex configuration. The value of this pin is latched on the rising edge of MRST# for use as CDEVSEL3, bit 3 of the MII Device Select Address. |
| 40 | DGND | supply | Ground: Digital Ground connection. |

TABLE 13F

Media Independent Interface Pins

| Pin | Name | Type | Function |
|---|---|---|---|
| 41 | MRST# | In. | MII Reset: Reset signal to the PMD front end (active low). |
| 42 | MDIO | I/O | Management Data I/O: Serial management interface to PMD chip. MDIO is synchronous to MDCLK. |
| 43 | MDCLK | In | Management Data Clock: Serial management interface to PMD chip. |
| 44 | DVDD | supply | Power: Digital 3.3V supply connection. |
| 45 | MRXER | Out | Receive Error: Indicates reception of a coding error on received data. MRXER is synchronous to MRCLK. |
| 46 | MRXDV | Out | Receive Data Valid: Indicates data on MRXD0-3 is valid. MRXDV is synchronous to MRCLK. |
| 47 | MRXD3 | Out | Receive Data Bit 3: Nibble Receive data bit 3 from the PHY. Data is synchronous to MRCLK. |
| 48 | MRXD2 | Out | Receive Data Bit 2: Nibble Receive data bit 2. |
| 49 | DGND | supply | Ground: Digital Ground connection. |
| 50 | MRXD1 | Out | Receive Data Bit 1: Nibble Receive data bit 1. |
| 51 | +5V | supply | Power: Digital 5V supply connection. |
| 52 | MRXD0 | Out | Receive Data Bit 0: Nibble Receive data bit 0. |
| 53 | DVDD | supply | Power: Digital 3.3V supply connection. |
| 54 | MRCLK | Out | Receive Clock: Receive clock source from the PHY. This clock will be 2.5MHz in 10BASE-T mode, and 25MHz in 100BASE-X mode. |
| 55 | MCRS | Out | Carrier Sense: This signal asserts when the PHY initiates a frame reception. |
| 56 | MCOL (CDEVSEL4) | I/O | Collision Detect: This signal indicates that the PHY is receiving data whilst also transmitting. This signal will not assert in full-duplex mode. |

TABLE 13F-continued

Media Independent Interface Pins

| Pin | Name | Type | Function |
|---|---|---|---|
| 57 | MTXER | In | The value of this pin is latched on the rising edge of MRST# for use as CDEVSEL4, bit 4 of the MII Device Select Address. Transmit Error: This signal allows coding errors to be propagated across the MII. MTXER is synchronous to MTCLK. |
| 58 | MTXEN | In | Transmit Enable: This signal indicates valid transmit data on MTXD0-3. MFIXEN is synchronous to MTCLK. |
| 59 | DGND | supply | Ground: Digital Ground connection. |
| 60 | MTXD3 | In | Transmit Data Bit 3: Nibble Transmit data bit 3 from the MAC. Data is synchronous to MTCLK. |
| 61 | MTXD2 | In | Transmit Data Bit 2: Nibble Transmit data bit 2. |
| 62 | MTXD1 | In | Transmit Data Bit 1: Nibble Transmit data bit 1. |
| 63 | MTXD0 | In | Transmit Data Bit 0: Nibble Transmit data bit 0. |
| 64 | N/C | | No connect: Leave this pin unconnected. |
| 65 | DVDD | supply | Power: Digital 3.3V supply connection. |
| 66 | MTCLK | Out | Transmit Clock: Transmit clock source from the PHY. This clock will be 2.5MHz in 10BASE-T mode, and 25MHz in 100BASE-X mode. |

TABLE 13G

JTAG Test Port Pins

| Pin | Name | Type | Function |
|---|---|---|---|
| 67 | JTRST# | In | Test Access Port Reset. Used to reset the test port controller (optional). |
| 68 | JTMS | In | Test Mode Select: Used to control the state of the test port controller within the PHY. |
| 69 | JTCLK | In | Test Clock: Used to clock state information and test data into and out of the device during operation of the test port. |
| 70 | DGND | supply | Ground: Digital Ground connection. |
| 71 | JTDO | Out | Test Data Output: Used to serially shift test data and test instructions out of the device during operation of the test port. |
| 72 | +5V | supply | Power: Digital 5V supply connection. |
| 73 | JTDI | In | Test Data Input: Used to serially shift test data and test instructions into the device during operation of the test port. |
| 74 | N/C | | No connect: Leave this pin unconnected. |
| 75 | DGND | supply | Ground: Digital Ground connection. |

TABLE 13H

Serial Test Mode Interface Pins

| Pin | Name | Type | Function |
|---|---|---|---|
| 76 | FXMTN | an | Serial Data Output Pair: Reserved for TI Manufacturing Test. |
| 77 | FXMTP | an | Treat as a No Connect. |
| 78 | DVDD | supply | Power: Digital 3.3V supply connection. |
| 79 | FRCVN | an | Serial Data Input Pair. Reserved for TI Manufacturing Test. |
| 80 | FRCVP | an | Treat as a No Connect. |
| 81 | DGND | supply | Ground: Digital Ground connection. |
| 82 | FSDN | an | Serial Data Detect Pair: Reserved for TI Manufacturing Test. |
| 83 | FSDP | an | Treat as a No Connect. |

TABLE I

Network Interface Pins

| Pin | Name | Type | Function |
|---|---|---|---|
| 84 | AVDD | supply | Power: Analog 3.3V supply connection. |
| 85 | ACT | an | Centre Tap: Connection to the primary centre-tap of the transmit transformer. |
| 86 | AGND | supply | Ground: Analog Ground connection. |

TABLE I-continued

Network Interface Pins

| Pin | Name | Type | Function |
| --- | --- | --- | --- |
| 87 | AXMTP | an | Transmit Pair: Differential line outputs from the device to the |
| 88 | AXMTN | an | transformer and termination components. |
| 89 | AGND | supply | Ground: Analog Ground connection. |
| 90 | AGND | | |
| 91 | ARCVP | an | Receive Pair: Differential line inputs to the device from the |
| 92 | ARCVN | an | transformer and termination components. |
| 93 | AVDD | supply | Power: Analog 3.3V supply connection. |
| 94 | ATEST2 | an | Analogue Test 2: A T.I. analogue test pin. Treat his pin as a no-connect (N/C). |
| 95 | ATEST3 | an | Analogue Test 3: A T.I. analogue test pin. Treat his pin as a no-connect (N/C). |
| 96 | AVDD | supply | Power: Analog 3.3V supply connection. |
| 97 | N/C | | No connect: Leave this pin unconnected. |
| 98 | ATEST4 | an | Analogue Test 3: A.T.I. analogue test pin. Treat his pin as a no-connect (N/C). |
| 99 | AGND | supply | Ground: Analog Ground connection. |
| 100 | AGND | | |

Figure 17:
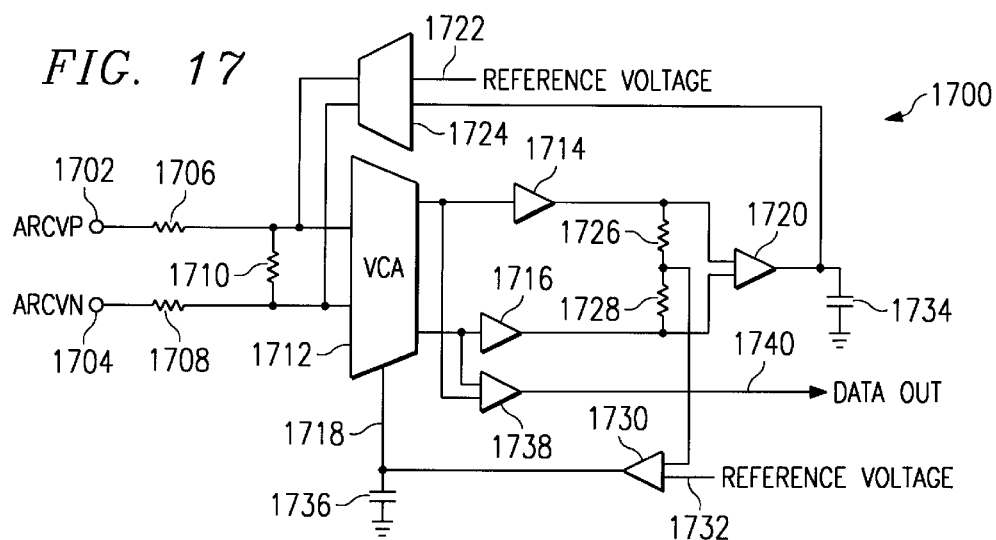
FIG. 17 depicts a simplified block diagram of the 10 Base-TX receiver of the physical layer interface device of FIG. 1.

Referring now to FIG. 17, there may be seen a simplified block diagram of a 100 Base-T differential line receiver 1700. More particularly, it may be seen that the receiver 1700 has two input lines that receive differential signal inputs, ARCVP 1702 and ARCVN 1704. These two differential signal inputs are the outputs from an external isolation transformer (not depicted in FIG. 17) which connects the transmission line to the data source from which the signals are received.

As may be seen from FIG. 2, the receiver 1700 does not require an external signal resistor divider network. Instead, the resistor divider network is an initial portion of the receiver. This network consists of the three resistors 1708, 1710 arranged on the input lines of the receiver. This network serves to reduce the voltage swings seen by later receiver circuitry to about half of what would be seen without the resistor network.

The differential signals from the voltage divider network are applied to an adjustable gain amplifier (AGA) or voltage controlled amplifier (VCA) 1712 that serves to boost the signal for losses that occurred during transmission along the transmission line. This boost is preferably dependent on frequency; this is because the signal loss in the transmission line is dependent upon frequency and the length of the line. The two boosted outputs from the VCA are then each passed to a peak voltage detector 1714, 1716.

The two peak voltage detectors 1714, 1716 serve to perform two essential functions. One function is to determine the amount of baseline wander so that it may be removed. The other function is to determine the signal strength so that it may be boosted to the correct level, via a feedback signal 1718 provided to the VCA 1712. Baseline wander may occur when long delays occur between signal level transitions; baseline wander occurs because the transformers used to isolate the transmission line have a low inductance and will cause any fixed level signal to slowly decay (with more decay occurring with more time) and any subsequent signal level transition drives the signal level farther than would otherwise be necessary to provide an "edge".

To compensate for baseline wander, the outputs from the detectors 1714, 1716 are provided as inputs to an operational amplifier ("op amp") 1720. The first detector 1714 measures the high level of the signal including any baseline wander bias. Because the input signal is a differential signal, the second detector 1714 measures the high level of the negative signal, including any bias from any baseline wander; however, this high level corresponds to the low level (or trough) of the signal seen by the first detector 1714. That is, the two detectors 1714, 1716 measure the peak and trough of the signal, which is its peak-to-peak value. Accordingly, the bias from any baseline wander may be compensated for, since the true baseline is half-way between the peak-to-peak value. The op amp's output is filtered by a capacitor 1734. The output from the op amp 1720 may be compared to a reference voltage 1722 in an amplifier 1724 and then an appropriate level adjustment is made to the input signals to the VCA 1712 to offset any baseline wander bias. In this manner the baseline wander is removed before the signal enters any active circuitry, allowing the VCA 1712 more headroom, if needed, and in combination with the initial voltage divider of three resistors 1706, 1708, 1710 limits the voltage excursions seen by the VCA 1712 at its inputs.

One alternative to this relatively simple approach is to recreate the original transmitted signal and then subtract it from the incoming signal to determine the amount of any baseline wander. However, because this is effectively a positive feedback type of system, it can easily get out of control.

A portion of the output voltage from the two peak detectors is dropped across a pair of resistors 1726, 1728 and the resulting output voltage is provided to another op amp 1730 where it is compared to a reference voltage 1732 and then used as the feedback signal 1718 to the VCA to control the amount of boost provided by the VCA 1712. The feedback 1718 is filtered by a capacitor 1736. Again, the amount of boost is preferably dependent upon frequency. Preferably, the amount of boost is dependent upon the length of the transmission line and frequency; that is, the amount of boost as a function of received signal strength is modified as a function of frequency. The frequency compensation is selected to offset the high frequency attenuation of the signal down the transmission line as a function of line length. In this manner the output of the VCA 1712 is adjusted to fall within a desired range of signal values for a desired range of frequencies. That is, the signal that was originally transmitted was transmitted at some known signal level, within a specified range of accuracy. This boost provides an output signal from the receiver at approximately the same level for the various frequency components as the original transmitted signal.

The outputs from the VCA 1712 are further provided to a comparator 1738 whose output is the data output 1740; that is, the signal corresponding to the received input signal, but suitably adjusted for any baseline wander and suitably adjusted for any signal losses occurring during transmission.

Figure 18:
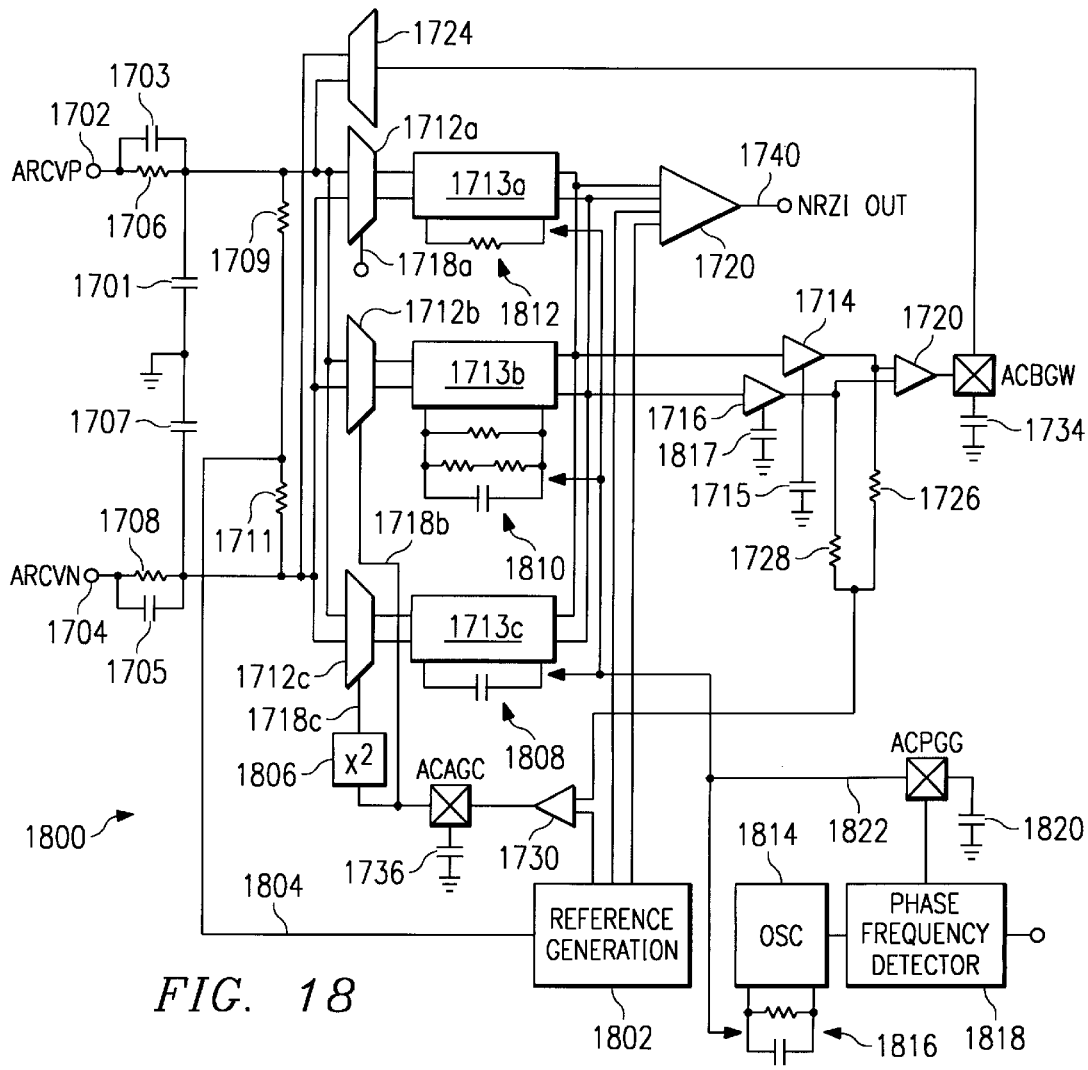
FIG. 18 depicts a block diagram of the 100 Base-TX receiver of the physical layer interface device of FIG. 1.

Referring now to FIG. 18, there may be seen another simplified block diagram of a 100 Base-T differential line receiver 1800. More particularly, it may be seen that the receiver has two input lines that receive differential signal inputs, ARCVP 1702 and ARCVN 1704. These two differential signal inputs are the outputs from the external isolation transformer (not depicted in FIG. 18) which is connected to the transmission line.

As may be seen from the block diagram, the voltage divider network is an initial portion of the receiver 1800 made up of resistors 1706, 1708, 1709, 1711 and capacitors 1701, 1703, 1705, 1707. This network serves to reduce the voltage swings seen by later active receiver circuitry to about half of what would be seen without the network.

The signals from the voltage divider network are applied to a plurality of adjustable gain amplifiers (VCAs) 1712a, 1712b, 1712c that serve to boost the signal for an assigned frequency spectrum for losses that occurred during transmission along the transmission line. Although three such VCAs are shown, clearly, more or less VCAs may be so employed and still be within the scope of the present invention. Each VCA is responsible for the boost over an assigned frequency band. In FIG. 18, one VCA 1712a is assigned all frequencies, a second VCA 1712b is assigned a middle range of frequencies (1–20 MHz) and the third VCA 1712c is assigned a high range of frequencies (20 MHz and up). In addition, the output of each VCA is supplied to a equalizer circuit 1713a, 1713b, 1713c designed to compensate for or partially compensate for line losses in that VCA's assigned frequency spectrum.

As depicted in FIG. 18, the actual amount of boost may be different for each frequency band. That is, the first VCA 1712a for the entire frequency range has a fixed amount of feedback 1718a so that there is no boost to the input signals. The second VCA 1712b (middle frequencies) has an amount of feedback 1718b based upon the feedback circuit 1730 output. The third VCA 1712c (high frequencies) has its feedback based upon the square 1806 of the output of the feedback circuit 1730. Thus, the overall boost and equalization is dependent on frequency. The two differential outputs from each equalizer circuit 1713a, 1713b, 1713c are then summed into a single pair of outputs and then each composite output is passed to a peak voltage detector 1714, 1716.

The two peak voltage detectors 1714, 1716 serve to perform two essential functions. One function is to determine the amount of baseline wander so that it may be removed. The other function is to determine the signal strength so that it may be boosted, via feedback 1718a, 1718b, 1718c to the VCAs, to the correct level. These functions are as described hereinabove, but additional circuit elements are illustrated.

The summed outputs from the equalizer circuits are further provided to a comparator 1720 whose output 1740 is the data output, NRZOUT; that is, the signal corresponding to the received input signal, but suitably adjusted for any baseline wander and suitably adjusted for any signal losses occurring during transmission.

Turning now to the equalization circuits 1713a, 1713b, 1713c depicted in FIG. 18, it may be seen that each circuit has associated therewith a resistor/capacitor (RC) network 1812, 1810, 1808, respectively, to determine the amount of equalization as a function of frequency. It may also be seen that there is a control signal 1822 supplied to these RC networks for controlling the resistance of the resistor(s) in a network. Some equalization circuits may contain only capacitors; for such a capacitor only circuit there is no need to supply it with a control signal. The control signal is provided by an output from a voltage controlled oscillator (VCO) portion 1818 of a phase locked loop (PLL).

A reference voltage generation circuit 1802 is depicted as also providing an output voltage to the voltage divider at the input of receiver 1800 via line 1804. Appropriate reference voltages are supplied by circuit 1802 to other portions of the receiver 1800. Some reference voltages are supplied to an oscillator circuit 1814 that has a frequency determination circuit 1816 attached thereto; the frequency determination circuit 1816 is also supplied with control signal 1822.

The three capacitors 1734, 1736 and 1820 are external capacitors attached to pins ACBLW, ACAGC and ACPLL, respectively.

Figure 19:
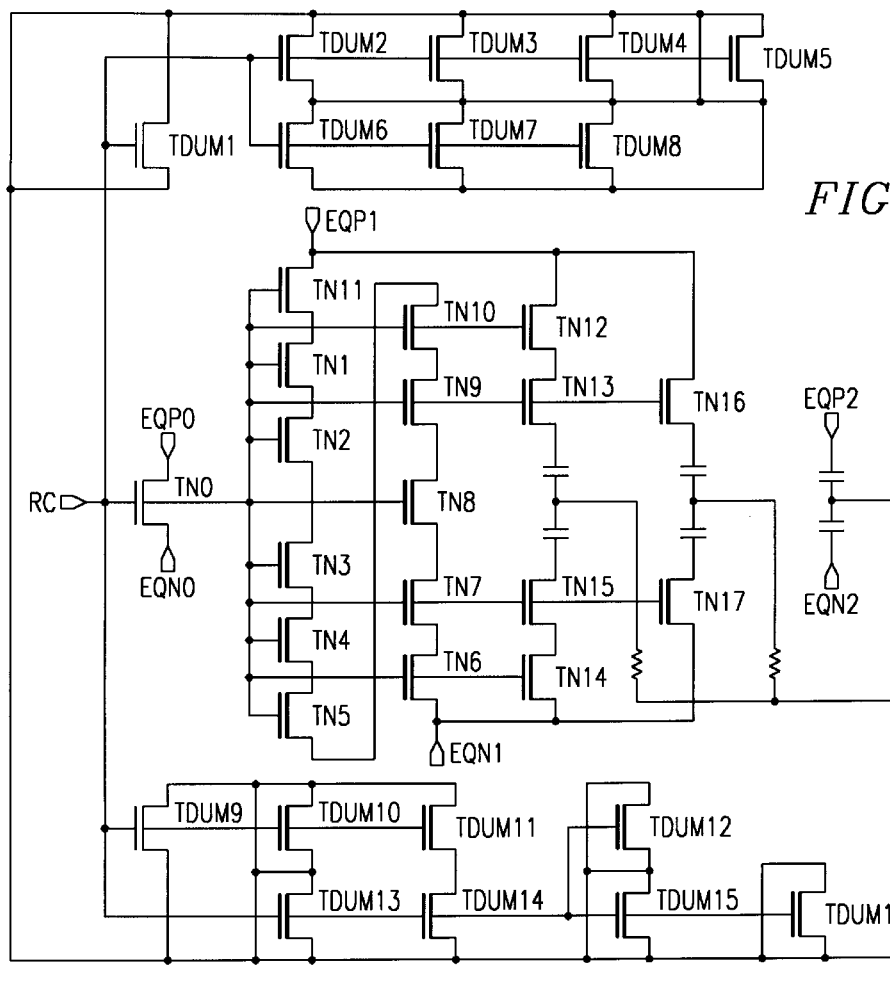
FIG. 19 depicts a more detailed diagram of a portion of the 100 Base-TX receiver of FIG. 18.

FIG. 19 depicts one embodiment of the RC network for each of the three equalizer circuits of FIG. 18. More particularly, there may be seen a first MOSFET (tn0) that is controlled by a bias voltage RC. Again, RC is the output from the VCO portion of the PLL. This MOSFET (tn0) is biased by RC to be in a linear operating range and acts as a resistor for the first equalizer circuit; it also has some intrinsic capacitance. There may also be seen a plurality of MOSFETs (tn1–tn17), two resistors (i0 and i1) and two pair of capacitors (2_i0, 2_i1 and 2_i2, 2_i3) that form the RC network for the second equalizer circuit. Finally, a pair of capacitors (2_i4, 2_i5) and a resistor (i2) are the RC network for the third equalizer network. The MOSFETs (tn1-tn17) are also controlled by bias voltage RC to ensure operation in their linear regions and they act as resistors for adjusting the frequency characteristics of the RC network. By making the RC signal the same as that in the PLL, tunable MOSFETs may be used to accurately set the equalization time constants since it is the same voltage used to set the tunable MOSFETs in both the equalizer and the PLL's VCO and the capacitors simply scale. This circuit illustrates how the MOSFETs may be suitably biased in a process with inaccurate resistor values to provide and maintain an accurately controlled bandwidth. That is, the transconductance is defined to the accuracy of the capacitor which is more accurate than the resistor to define the equalization time constants.

Figure 20:
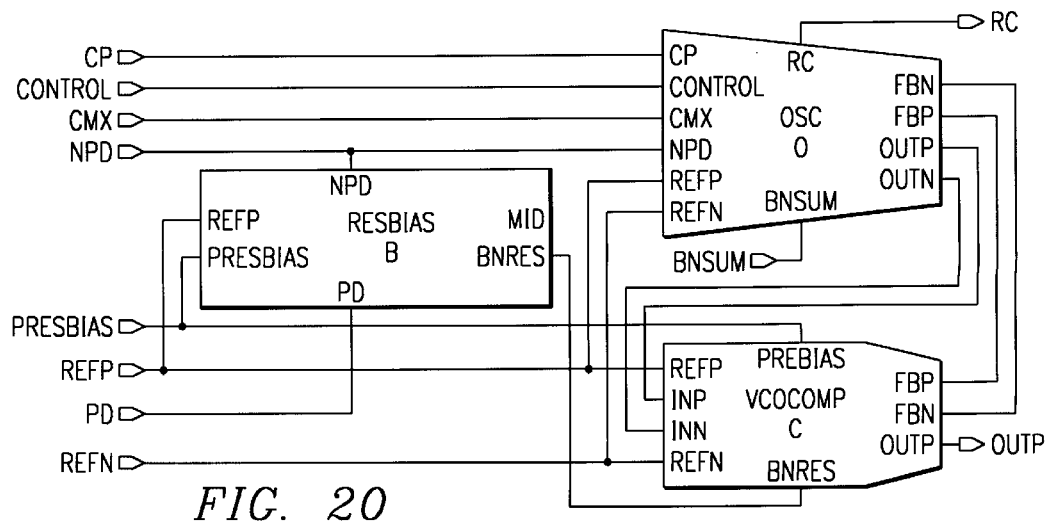
FIG. 20 depicts a simplified block diagram of a portion of the 100 Base-TX receiver of FIG. 18.
Figure 21:
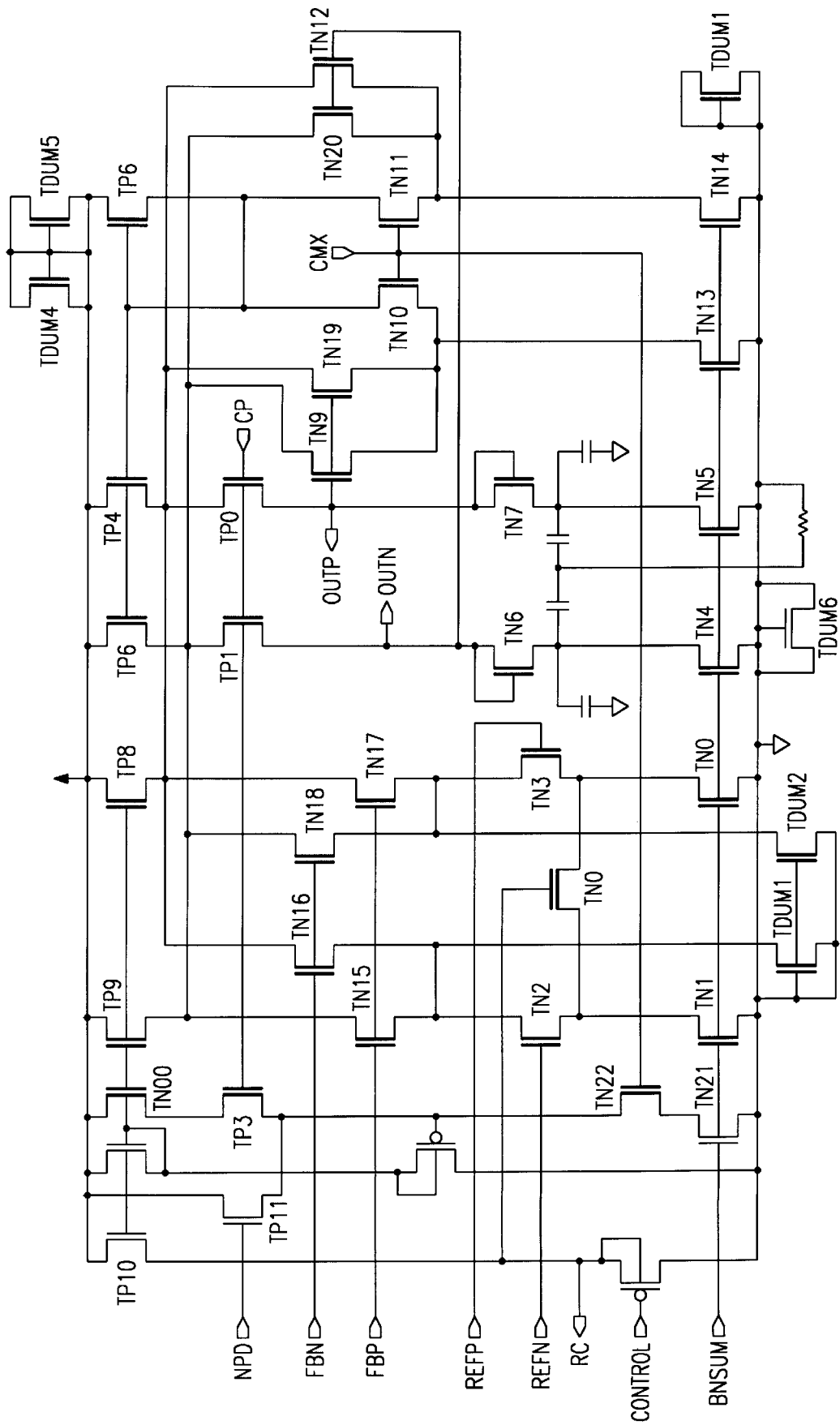
FIG. 21 depicts a more detailed diagram of a portion of the circuitry depicted in FIG. 20.
Figure 22:
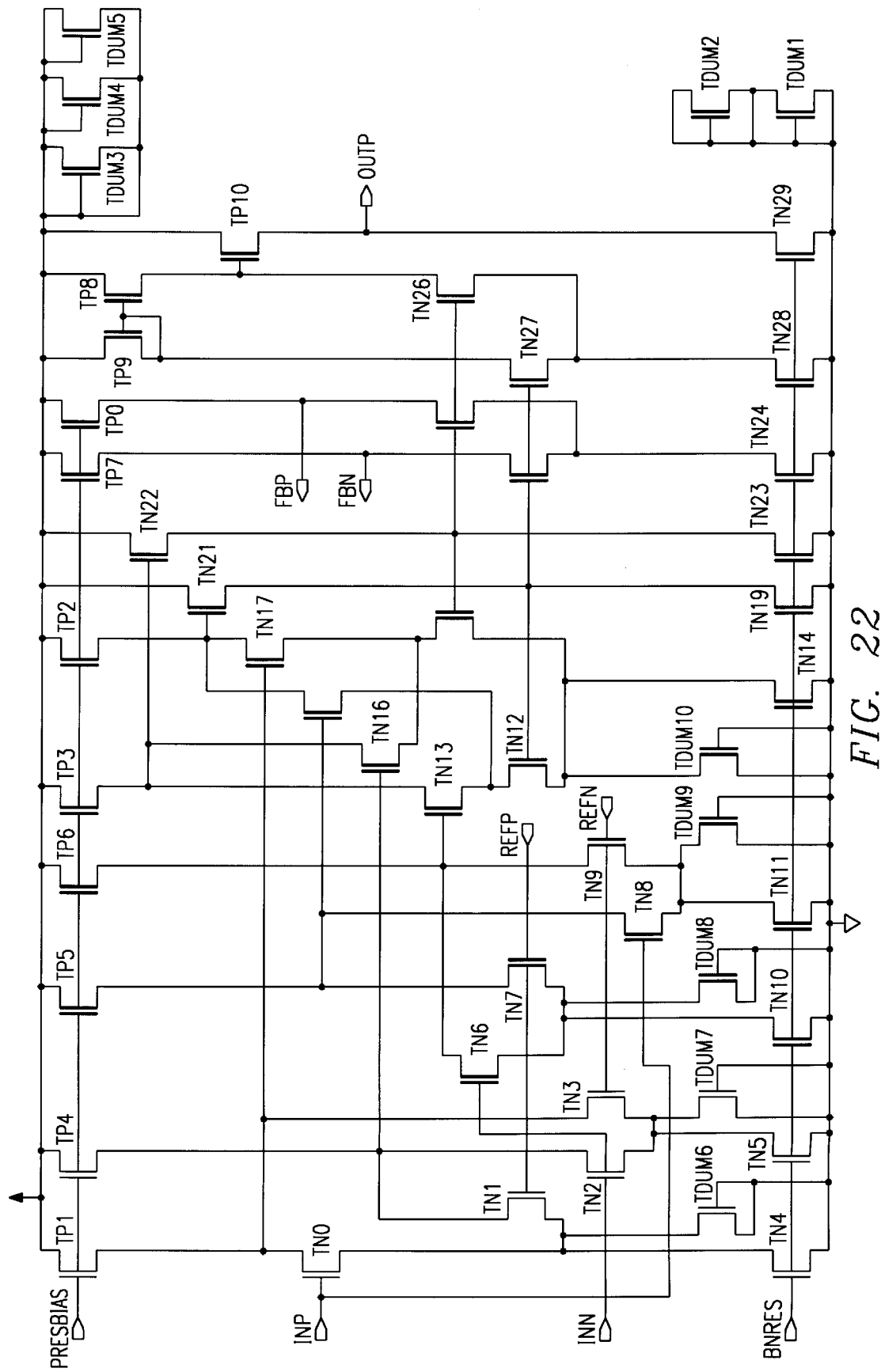
FIG. 22 depicts a more detailed diagram of a portion of the circuitry depicted in FIG. 20.
Figure 23:
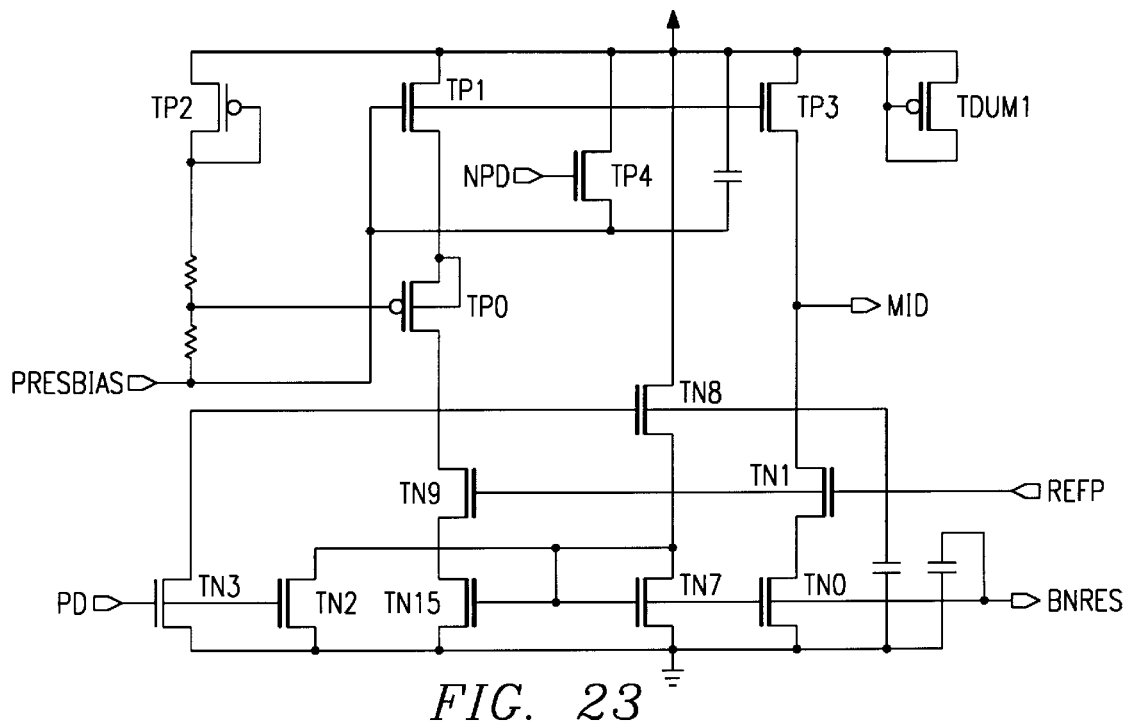
FIG. 23 depicts a more detailed diagram of a portion of the circuitry depicted in FIG. 20.

Referring now to FIG. 20, there may be seen a more detailed depiction of a portion of FIG. 18. More particularly, there may be seen a depiction of how the oscillator block may be subdivided into an oscillator block, a voltage comparison block (vcocomp), and a resbias block and their interconnections. FIG. 21 depicts detailed circuitry for a portion of the oscillator block. FIG. 22 depicts detailed circuitry for a portion of the vcocomp block. FIG. 23 depicts detailed circuitry for the resbias block.

In FIG. 20, the CP signal is a cascode bias for "p" type MOSFETs and CONTROL is the signal for speeding up or slowing down the oscillator frequency. The CMX signal is the common mode reference voltage, PD is a power down signal and NPD is a not power down signal. REFP and REFN are "p" and "n" type transistor bias voltages, respectively. PRESBIAS and BNSUM are bias voltages for "p" and "n" MOSFETs pairs to place the p MOSFET in its linear (resistive) operating region; RC is the resulting bias output. OUTP is the square wave output clock signal.

Referring now to FIG. 21, there may be seen a pair of capacitors (2_i0 and 2_i1) that form the core of the oscillator circuit and that are appropriately charged and discharged to provide a positive output signal, OUTP, and a negative output signal, OUTN; these output signals have a sawtooth or triangular waveform. The currents through transistors tn6 and tn7 are used to charge and discharge theses capacitors. The currents in transistors tn6 and tn7 are in opposite directions, such that when one increases by a given amount the other decreases by that same amount; that is, they are in a push-pull mode for charging or discharging the pair of capacitors. When one transistor is charging one side of one of the capacitors the other is charging the opposite side of the other capacitor.

More particularly, there is a constant DC current through these two transistors that mixes with the current from transistors tn0 and tn4. At times the current from transistors tn6 and tn7 may be sufficient to overcome the static current from transistors tn0 and tn4; this results in a charging of the associated capacitor. At times the current from transistors tn6 and tn7 may be insufficient to overcome the static current from transistors tn0 and tn4; this results in a discharging of the associated capacitor.

There is a common mode feedback circuit of transistors tn9–tn12 and tn19–tn20 connected to the OUTP line and OUTN line that serves to keep the capacitor voltage swings centered around a fixed voltage, CMX. The amount of current passing through transistors tn6 and tn7 is determined by two transistor pairs, tn16/tn18 and tn15/tn17; these pairs are turned on or off by a pair of bias voltages (FBN, FBP) supplied by the vcocomp block. These two signals are feedback from the vco comparison block (see FIG. 22) and force one of the pairs on and the other off.

REFP and REFN are fixed reference bias voltages that determine the current through transistors tn2 and tn3. The CONTROL signal is a signal from the phase comparator portion of the PLL circuitry that serves to speed up or slow down the rate of charging and discharging of the capacitors to change the PLL frequency to get the PLL and external clock rates in synchronism. The not power down (NPD) signal is used to appropriately kill the bias for the rest of the circuit. Note that the RC signal, which is used by at least the equalization circuitry, is generated by this circuitry and appropriately provided to the other circuitry of the receiver.

Referring now to FIG. 22, there may be seen the detailed circuitry for a portion of the vcocomp block of FIG. 20. The differential signal from the oscillator block (OUTN and OUTP) of FIG. 21 is supplied to this circuit by the INP and INN signals (on the far left edge of circuit). These signals are compared to REFP and REFN by tn0 and tn1, and tn2 and tn6, respectively, as well as by other pairs. These pairs drive an ECL latch (tp3, tn13, tn12, tdum10, tn16, tn20, tn14, tp2, tn17, tn18, tn21, tn19, tn22 and tn23) that serves to lock in a transition and provide a jitter resistant circuit. The latch provides differential square wave feedback outputs (FBP and FPN) to the oscillator of FIG. 21, via other transistor pairs. A rail-to-rail square wave voltage output is provided by OUTP.

Referring now to FIG. 23, there may be seen the detailed circuitry for a portion of the resbias block of FIG. 20. Half the current of this circuit passes through p MOSFET (tp3) and its leg and the other half passes through p MOSFET (tp1) and its leg. These two MOSFETs are acting as load resistors. PRESBIAS and BNRES are used to set up the bias on these two FETs to place them in their linear operating region. The drain/source voltages for FETs (tn9 and tn15) are driven to match the corresponding voltages for other FETs similarly disposed, by outputting their gate voltage as BNRES. That is, BNRES is the bias for n type "resistor" FETs.

Figure 24:
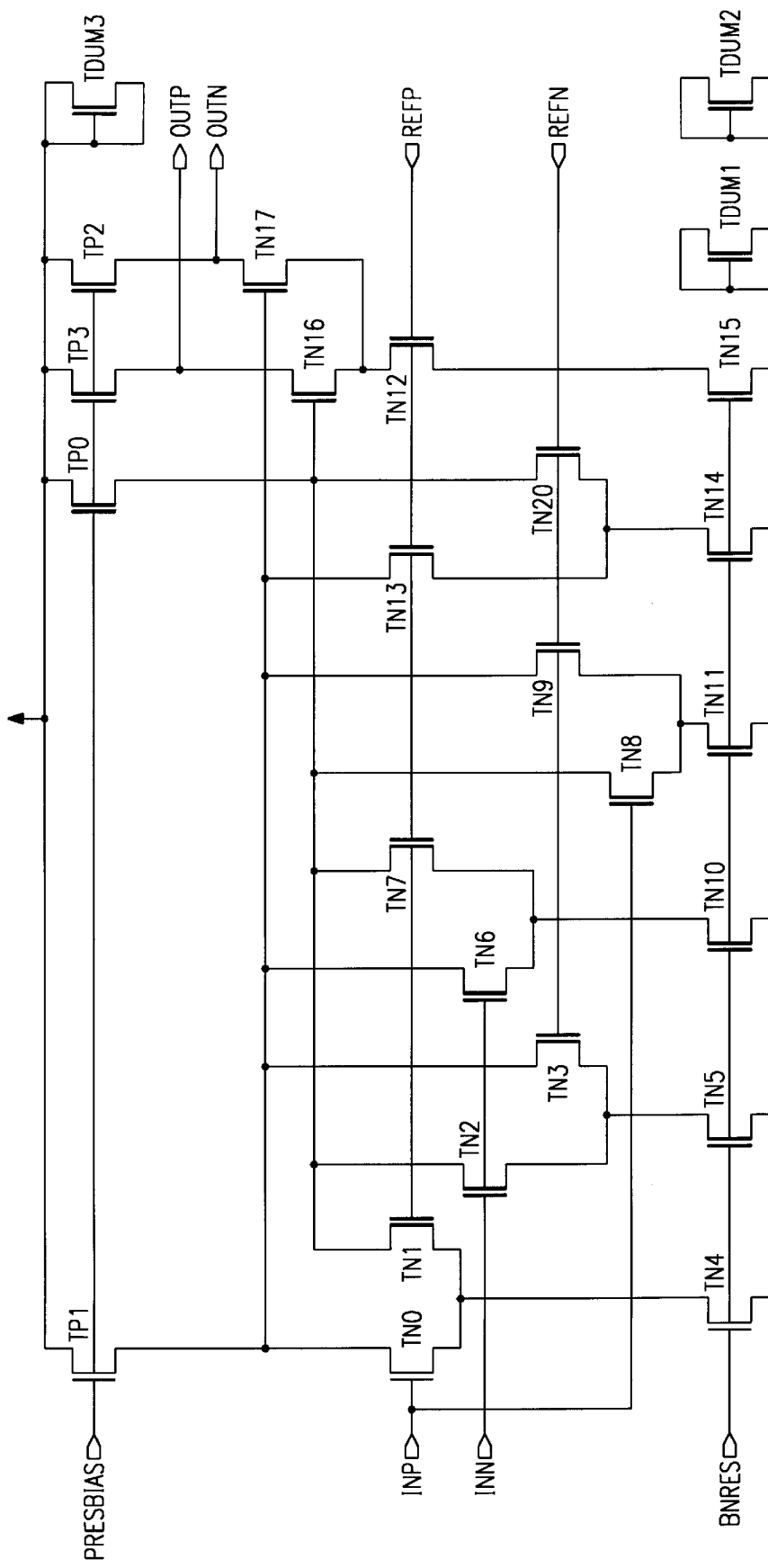
FIG. 24 depicts detailed circuitry for a portion of a high speed comparator, such as that used in FIGS. 17 and 18.

Referring now to FIG. 24, there may be seen the detailed circuitry for a portion of a high speed comparator, such as that used in FIGS. 17 and 18. This circuit uses the PRESBIAS and BNRES signals to appropriately bias its FETs to provide load resistors. Again, the differential inputs INP and INN are compared to REFP and REFN and provide a differential output on OUTP and OUTN that swings peak-to-peak. The transition time for an input signal edge is about 4 nanoseconds, and the transition time for the circuit is of the order of a few hundred to five picoseconds. Half the current at the switching point flows through load FETs (tp3 and tp2).

Figure 25:
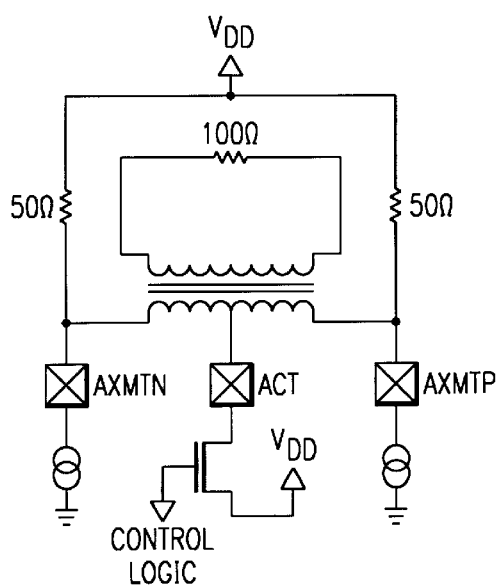
FIG. 25 depicts a simplified block diagram of the interconnection of transmitter current sources with the external transmitter load resistors and the external isolation transformer.

Referring now to FIG. 25, there may be seen a simplified block diagram of the interconnection of the two symmetrical transmitter current sources/sinks with the external transmitter load resistors and the external isolation or coupling transformer. During 10 Base-T operations the MOSFET acts as a switch and is closed by an appropriate gate signal from control logic and connects the analog Vdd to the center tap (ACT) of the coupling transformer. During 100 Base-T operations the MOSFET is opened by an appropriate gate signal from control logic and disconnects the center tap (ACT) of the coupling transformer from the analog Vdd.

During 100 Base-T operations one current sink turns on and draws a maximum current (corresponding to a +1) through the coil of the transformer and the load resistor on the opposite side of the coil from the current sink (the opposite load resistor), as well as the load resistor on the same side, from Vdd. This current is then dropped to zero and the other current source begins its current ramp in the opposite direction (corresponding to a −1) through the transformer coil and opposite load resistor. Thus, only one current source is being driven at a time for a nonzero waveform. For a zero waveform, both of the current sources are switched on, but at half the current value when they operate individually. This provides a smaller and more accurate voltage swing that is symmetrical.

During 10 Base-T operations one current sink turns on and pulls a maximum current through its half of the coil of the transformer from Vdd; the other half of the coil moves by the same amount (about 1.25 V) above Vdd by transformer action, giving a maximum voltage across the primary coil centered on Vdd. Then the opposite current sink in turn turns on and pulls a maximum current through its half of the transformer coil from Vdd. Again, this provides a maximum voltage drop across the full coil. Thus, both current sources are being alternately driven. This provides a higher voltage output that tolerates inaccuracies in voltages which can not be tolerated for the 100 Base-T case.

In this manner, the combined 10 Base-T/100 Base-TX transmitter uses a single RJ45 connector with no external switching transistors or relays. Further, no external capacitors and resistors are needed to provide appropriate time constants to ensure proper switching. This method of connection allows for a fully terminated and symmetrical performance for 100 Base-TX operations while also allowing for 10 Base-T operations at 3.3 Volts.

Figure 26:
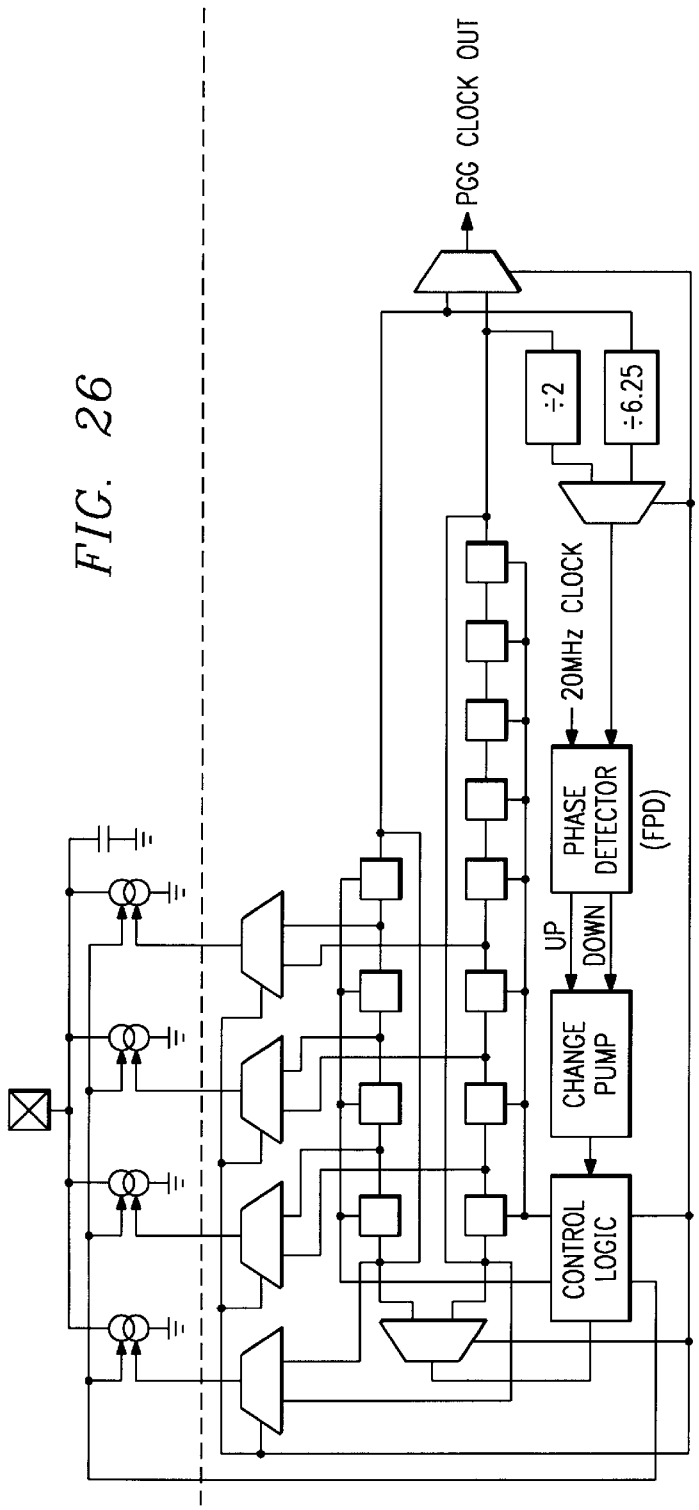
FIG. 26 depicts a simplified block diagram of a circuit for staged turn-on of transmitter current sources for controlled rise times.

Referring now to FIG. 26, there may be seen a simplified block diagram of a circuit for a properly staged turn-on of transmitter current sources using signals from a re-circulating delay line that is a portion of the analog PLL circuitry of the PHY of the present invention. In this manner, the turn-on and turn-off of the transmitter sources are unaffected by varying component precisions and varying device transconductances of the current sources/sinks that have on-chip capacitors connected to their gates to control rise times.

More particularly, it may be seen that the PLL includes two re-circulating delay lines one of which is selected to provide 10 Base-T operations and the other for 100 Base-TX operations. The PLL includes conventional phase detector circuitry that compares a 20 MHz external clock signal with the output from one of the delay lines, appropriately divided to make the comparison meaningful; the appropriate output is selected by a multiplexer (mux) controlled by a control signal provided by a block of control logic. The phase detector in turn provides an output signal of up or down, to increase or decrease the clock rate of the re-circulating delay line, to a charge pump circuit, which adds or subtracts charge on a capacitor that speeds up or slows down the rate of re-circulation along a delay line. However, this speed up or slow down signal is passed to a block of control circuitry that determines which delay line should receive the signal and also provides control signals to various multiplexers that select the outputs from the desired re-circulating delay line. The control logic may also provide a signal to the start of the selected delay line to initiate its startup.

Strobe signals from the outputs of the various elements that make up a delay line are provided to a plurality of current sources. In FIG. 26, four such current sources have been depicted as connected in parallel; these four current sources represent one of the current sources from FIG. 25. Clearly, more or fewer such current sources may be so employed. The strobe signals from the elements of the delay line serve to turn on (or turn off) an associated current source. In this manner, the current sources are turned on in delayed stages to provide a controlled rise time without the use of external rise time control components; using this technique allows for such components to be on-chip, such as for example the capacitor depicted in FIG. 26, which serves to smooth the resulting waveform and eliminate or reduce any resulting staircase waveform. In a presently preferred embodiment of the present invention, four such current sources are employed and are turned on with one nanosecond delays from one source to the next so that all the sources are fully on in four nanoseconds. That is, appropriate strobes from the elements of a PLL delay line are provided to respective current sources at one nanosecond intervals.

The control logic also provides control signals to the current sources that determine whether the current source turns on or turns off and in which direction the current is generated. Although FIG. 26, depicts the sequential turn-on (or turn-off) of the four current sources, clearly one delay line could turn them on sequentially and the other delay line could turn them all on at the same time. Alternatively, selected elements of a desired delay line may provide strobe signals to appropriate current sources to provide the desired controlled rise time. Clearly, any number of delay lines with any number of elements may be employed to selectively control a preselected number of current sources.

Figure 27:
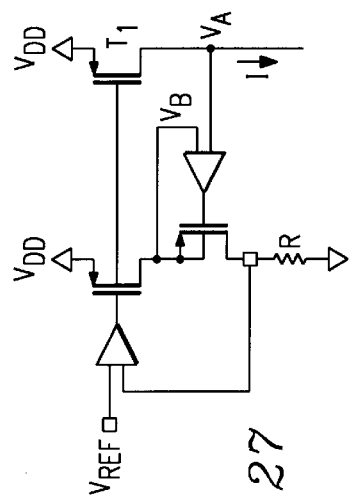
FIG. 27 depicts a simplified block diagram of a circuit for a high accuracy current reference for use in 100 Base-TX transmitter circuitry.

Referring now to FIG. 27, there may be seen a simplified block diagram of a circuit for a high accuracy current reference for use in the 100 Base-TX transmitter circuitry. More particularly, a new use of the control of a cascade gate voltage within a control-feedback loop reduces the effects of a finite output impedance in a current mirror without sacrificing voltage headroom on the output sourced current. For conventional current reference circuitry the current through the FET corresponding to FET T1 in FIG. 27 would have a current I equal to the voltage Vref divided by the value of resistor R. However, as Va varies then I varies due to the finite output impedance of T1 changing I when Va is not equal to Vb. The circuit of FIG. 27 monitors Va and forces Vb to be the same voltage. Then I is always Vref divided by R. If two FETs are substituted for T1 in FIG. 27, then they limit the level to which Va can rise before the lower FET of the two begins to turn off. The current I of FIG. 27 may be suitably employed in a current mirror circuit to provide the current sources of FIG. 25.

Figure 28:
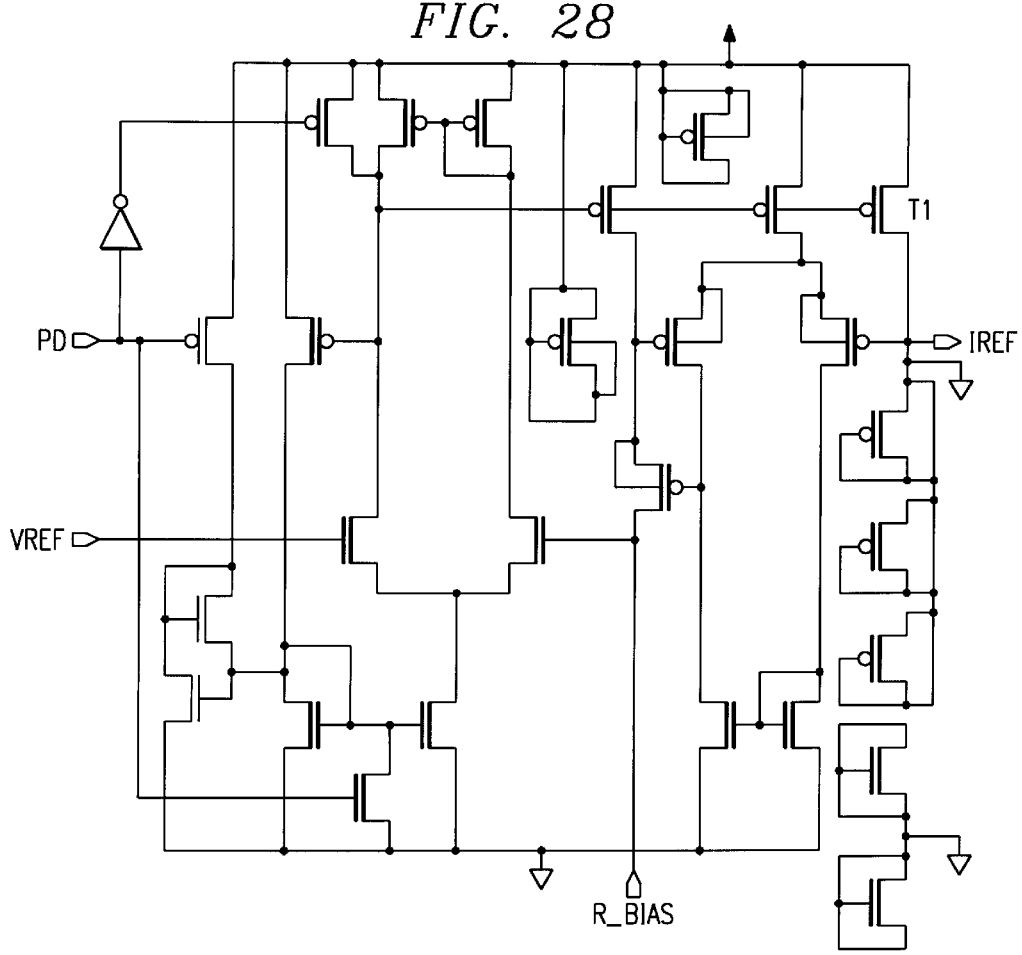
FIG. 28 depicts detailed circuitry of a preferred embodiment that implements the circuitry depicted in FIG. 27.

FIG. 28 depicts detailed circuitry of a preferred embodiment that implements the device depicted in FIG. 27.

Figure 29:
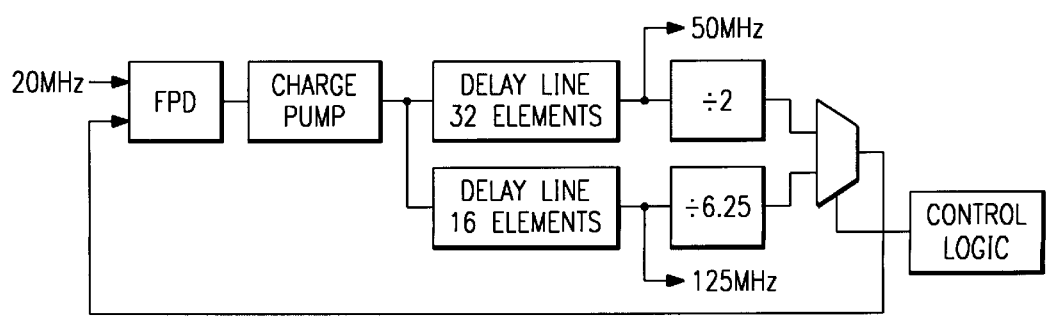
FIG. 29 depicts a simplified block diagram of a circuit using a single input frequency that allows for a dual DPLL rate.

Referring now to FIG. 29, there may be seen a simplified block diagram of a circuit using a single input frequency that allows for a DPLL rate for both 10 Base-T and 100 Base-TX when the clock recovery is performed digitally. This circuit employs two delay lines and uses either a divide by 6.25 stage or a divide by 2 in a PLL feedback loop which allows the compare rate and loop bandwidth to be kept high enough to allow for the use of internal loop-filter components rather than external components. Control logic selects the appropriate delay line and output.

While the invention has been described with reference to illustrative embodiments, this description is not intended to be construed in a limiting sense. Various modifications of the illustrative embodiments, as well as other embodiments of the present invention, will become apparent to those persons skilled in the art upon reference to this description. It is therefore contemplated that that the appended claims will cover any such modifications or embodiments as fall within the true scope of the invention.

What is claimed is:

1. A physical layer interface device, comprising:
   a first receiver, coupled to a receive input of the physical layer interface device, for processing signals received at the receive input according to a first mode of operation;
   a second receiver, coupled to the receive input, for processing signals received at the receive input according to a second mode of operation;
   a first transmitter for controlling the transmission of data from a pair of output terminals according to the first of operation;
   a second transmitter for controlling the transmission of data from the pair of output terminals according to the second mode of operation;
   control circuitry for selecting one of the first and second modes of operation and enabling the appropriate one of the first and second receivers and first and second transmitters corresponding to the selected mode of operation;
   a pair of current sinks, each coupled to one of the pair of output terminals for controllably sinking current according to the transmitted data, each of the pair of current sinks comprising a plurality of current sources coupled in parallel with one another between the corresponding output terminal and a reference voltage;
   a phase-locked loop, having first and second recirculating delay lines, coupled to the control circuitry so that, in the first mode of operation, the phase-locked loop operates using the first recirculating delay line, and in the second mode of operation, the phase-locked loop operates using the second recirculating delay line; and
   for each of the pair of current sinks, control logic coupled to the phase-locked loop, for controlling each of the plurality of current sources to sink current in a staged manner responsive to the phase-locked loop, to provide controlled rise time output signals corresponding to the selected mode of operation.

2. The physical layer interface device of claim 1 further including an external isolation transformer coupled to the pair of output terminals.

3. The physical layer interface device of claim 1 wherein said second transmitter further includes a programmable transmit voltage amplitude for waveform generation.

4. The physical layer interface device of claim 1 further including auto-negotiation circuitry for automatic selection of half/full duplex operation.

5. The physical layer interface device of claim 1 further including phase-locked loop (PLL) circuitry that uses a single clocking device in each of the first and second modes of operation.

6. The physical layer interface device of claim 1, wherein the phase-locked loop comprises:
analog phase locked loop (PLL) circuitry operable to provide a staged turn-on of the current sinks using signals from the selected re-circulating delay line.

7. The physical layer interface device of claim 1 further including digital phase locked loop (DPLL) circuitry operable to provide a plurality of DPLL operating rates using a single input frequency.

8. The physical layer interface device of claim 1, further comprising:
a center tap control terminal;
a controllable switch, for selectably coupling a power supply voltage to the center tap control terminal responsive to the control circuitry selecting the first mode of operation.

9. A physical layer interface device, comprising:
a first receiver for a first mode of operation;
a second receiver for a second mode of operation;
a first transmitter for a third mode of operation;
a second transmitter for a fourth mode of operation; and
control circuitry for determining a mode of operation and selecting an appropriate receiver from said first and second receivers and/or selecting an appropriate transmitter from said first and second transmitters;
wherein said second transmitter further includes synthesized rise time control for reduced electromagnetic interference such that no external capacitors are required.

10. The physical layer interface device of claim 9 wherein said second receiver further includes integrated adaptive equalization circuitry and baseline wander correction circuitry.

11. The physical layer interface device of claim 9 further including auto-polarity correction circuitry for providing immunity to receive pair reversal in said first mode of operation.

12. The physical layer interface device of claim 9 wherein said first receiver further includes a smart squelch function which only allows incoming data to pass if its input amplitude is greater than a minimum signal threshold and a specific pulse sequence is received.

13. The physical layer interface device of claim 9 further including automatic gain control circuitry for providing baseline wander correction and offsets for loss of signal strength.

14. The physical layer interface device of claim 13 wherein said automatic gain control circuitry includes two peak detectors and wherein said automatic gain control circuitry is operable to provide said baseline wander correction by minimizing the difference between said two peak detectors.

15. A physical layer interface device, comprising:
a first receiver for a first mode of operation;
a second receiver for a second mode of operation;
a first transmitter for a third mode of operation;
a second transmitter for a fourth mode of operation;
control circuitry for determining a mode of operation and selecting an appropriate receiver from said first and second receivers and/or selecting an appropriate transmitter from said first and second transmitters; and
adaptive equalization circuitry and analog CMOS circuitry and wherein high frequency boost in said adaptive equalization circuitry is applied as a function of mid-range frequency circuitry in said analog CMOS circuitry.

16. The physical layer interface device of claim 15 further including a phase locked loop (PLL) and wherein time constants for said adaptive equalization circuitry are generated by setting said PLL to tune a biased tranconductor with an appropriately ratioed capacitor.

17. A physical layer interface device, comprising:
a first receiver for a first mode of operation;
a second receiver for a second mode of operation;
a first transmitter for a third mode of operation;
a second transmitter for a fourth mode of operation;
control circuitry for determining a mode of operation and selecting an appropriate receiver from said first and second receivers and/or selecting an appropriate transmitter from said first and second transmitters; and
digital phase locked loop (DPLL) circuitry, operable to provide a plurality of DPLL operating rates using a single input frequency and comprising:
a first path through a first delay line; and
a divide by 6.25 stage in a PLL feedback loop to provide one of said plurality of DPLL operating rates.

18. The physical layer interface device of claim 17 wherein said DPLL circuitry further comprises:
a second path through a second delay line; and
a divide by 2 stage in said PLL feedback loop to provide another of said plurality of DPLL operating rates.

19. The physical layer interface device of claim 18 further including control logic circuitry for selecting one of said first and second paths.

20. A physical layer interface device, comprising:
a first receiver for a first mode of operation;
a second receiver for a second mode of operation;
a first transmitter for a third mode of operation;
a second transmitter for a fourth mode of operation;
control circuitry for determining a mode of operation and selecting an appropriate receiver from said first and second receivers and/or selecting an appropriate transmitter from said first and second transmitters; and
current reference circuitry for controlling a cascade gate voltage within a control-feedback loop to provide a high accuracy current reference to the physical layer interface device whereby effects of a finite input impedance in a current mirror are reduced without sacrificing voltage headroom.

21. A physical layer interface device, comprising:
a first receiver for a first mode of operation;
a second receiver for a second mode of operation;
a first transmitter for a third mode of operation;
a second transmitter for a fourth mode of operation;
control circuitry for determining a mode of operation and selecting an appropriate receiver from said first and second receivers and/or selecting an appropriate transmitter from said first and second transmitters;
equalization circuitry operable to compensate for losses in signals received by said second transmitter;
phase locked loop (PLL) circuitry for synchronizing said physical layer interface device to said received signal, said PLL circuitry having a voltage controlled output portion which provides as output a base voltage; and resistor/capacitor network circuitry for determining the amount of equalization as a function of frequency in accordance with said bias voltage output from said PLL.

22. A method of providing signal level control in a differential line receiver, the differential line receiver operable to accept differential signal inputs, the method comprising the steps of:

providing an internal resistor divider network operable to reduce voltage swing in the differential signal inputs;

providing amplifier means operable to boost said differential signal inputs in accordance with a first feedback signal to compensate for losses that occurred during transmission and further operable to compensate for baseline wander in said differential signal inputs in accordance with a second feedback signal to generate differential signal outputs;

measuring a high level of said differential signal inputs using a first peak voltage detector;

measuring a low level of said differential signal inputs using a second peak voltage detector;

generating a baseline signal in response to said high and low levels of said differential signal inputs;

determining a first adjustment value to compensate for baseline wander;

adjusting said first feedback signal in accordance with said first adjustment value;

determining a second adjustment value to compensate for said losses that occurred during transmission;

adjusting said second feedback signal in accordance with said second adjustment value; and providing said differential signal outputs to a comparator to generate a data output signal adjusted for baseline wander and for said losses that occurred during transmission.

23. The method of claim 22 wherein said step of determining a first adjustment value includes the steps of:

filtering said baseline signal; and comparing said filtered baseline signal to a first reference voltage to generate said first adjustment signal.

24. The method of claim 22 wherein said step of generating a second adjustment signal includes the steps of:

generating an output voltage signal by dropping said high and low levels of said differential signal inputs across a pair of resistors; and comparing said output voltage signal to a second reference voltage to generate a second adjustment signal.

25. An apparatus for providing signal control in a physical layer interface device, comprising:

voltage divider circuitry operable to reduce voltage swing in differential signal inputs;

adjustable amplifier circuitry operable to adjust said differential signal inputs to compensate for baseline wander and loss of signal strength in accordance with feedback signals from feedback circuitry, thereby generating differential signal outputs; and said feedback circuitry operable to measure said baseline wander and said loss of signal strength and to generate said feedback signals in response; and a comparator operable to generate a data out signal in response to said differential signal outputs.

26. The apparatus of claim 25 wherein said feedback circuitry comprises:

a first peak voltage detector operable to measure a high level of said differential signal outputs from said adjustable amplifier circuitry;

a second peak voltage detector operable to measure a low level of said differential signal outputs from said adjustable amplifier circuitry;

circuitry for determining the amount of baseline wander in accordance with a value half-way between said high level and said low level of said differential signal outputs;

circuitry for determining the amount of signal loss by comparing said differential signal outputs to a reference voltage.

27. An apparatus for providing signal control in a physical layer interface device, comprising:

a voltage divider network;

at least one adjustable gain amplifiers, each of said at least one amplifiers operable to generate boosted differential signal outputs by boosting a particular portion of said differential signal inputs in accordance with an assigned frequency spectrum and an associated feedback signal, whereby said differential signal inputs in each said assigned frequency spectrum may be boosted by different amounts;

at least one equalizer means, each of said equalizer means having an associated one of said at least one adjustable gain amplifiers and operable to compensate said boosted differential signal outputs for line losses, thereby generating equalized differential signal outputs;

summation means for summing said equalized differential signal outputs, thereby generating a final pair of differential signal outputs; and feedback circuitry operable to measure said baseline wander and said loss of signal strength and to generate said feedback signals in response.

28. The apparatus of claim 27 wherein said feedback circuitry includes:

first peak voltage detector means for determining baseline wander in said differential signal outputs and for adjusting said associated feedback signal in response; and second peak voltage detector means for determining signal strength in said differential signal outputs and for adjusting said associated feedback signal in response.

29. The apparatus of claim 27 wherein said at least one adjustable gain amplifier comprises three adjustable gain amplifier, a first of said three adjustable gain amplifiers operable to apply a fixed amount of feedback so that there is no boost applied to said associated portion of said differential signal inputs, a second of said three adjustable gain amplifiers operable to apply an amount of feedback based upon said feedback circuit output, and a third of said three adjustable gain amplifier operable to apply an amount of feedback based upon the square of said feedback circuit output.

30. A method of controlling time constants in adaptive equalization circuits in a physical layer interface device, comprising the steps of:

generating a bias voltage from a voltage controlled oscillator portion of a phase locked loop in the physical layer interface device;

using tunable MOSFETs to provide resistance in the adaptive equalization circuits; and setting said tunable MOSFETs using said bias voltage.

* * * * *